US010235771B2

United States Patent
Rad et al.

(10) Patent No.: US 10,235,771 B2
(45) Date of Patent: Mar. 19, 2019

(54) METHODS AND SYSTEMS OF PERFORMING OBJECT POSE ESTIMATION

(71) Applicant: QUALCOMM Incorporated, San Diego, CA (US)

(72) Inventors: Mahdi Rad, Graz (AT); Markus Oberweger, Graz (AT); Vincent Lepetit, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/495,665

(22) Filed: Apr. 24, 2017

(65) Prior Publication Data

US 2018/0137644 A1    May 17, 2018

Related U.S. Application Data

(60) Provisional application No. 62/420,944, filed on Nov. 11, 2016.

(51) Int. Cl.
| | |
|---|---|
| G06K 9/00 | (2006.01) |
| G06T 7/73 | (2017.01) |
| G06K 9/32 | (2006.01) |
| G06K 9/46 | (2006.01) |

(52) U.S. Cl.
CPC ............ *G06T 7/73* (2017.01); *G06K 9/00671* (2013.01); *G06K 9/3208* (2013.01); *G06K 9/3241* (2013.01); *G06K 9/4628* (2013.01); *G06T 2207/20084* (2013.01)

(58) Field of Classification Search
CPC . G06T 7/73; G06T 2207/20084; G06T 7/246; G06T 7/10; G06T 7/174; G06T 7/50; G06T 7/136; G06T 2207/30244; G06K 9/00671

See application file for complete search history.

(56) References Cited

U.S. PATENT DOCUMENTS

| | | | |
|---|---|---|---|
| 2008/0137956 A1 | 6/2008 | Yang et al. | |
| 2008/0187213 A1* | 8/2008 | Zhang ................ | G06K 9/00281 382/159 |

(Continued)

OTHER PUBLICATIONS

Crivellaro A., et al., "A Novel Representation of Parts for Accurate 3D Object Detection and Tracking in Monocular Images", IEEE International Conference on Computer Vision(ICCV), XP032866804, 2015, 9 pages.

(Continued)

*Primary Examiner* — Amir Alavi
(74) *Attorney, Agent, or Firm* — Polsinelli/Qualcomm

(57) ABSTRACT

Techniques are provided for estimating a three-dimensional pose of an object. An image including the object can be obtained, and a plurality of two-dimensional (2D) projections of a three-dimensional bounding (3D) box of the object in the image can be determined. The plurality of 2D projections of the 3D bounding box can be determined by applying a trained regressor to the image. The trained regressor is trained to predict two-dimensional projections of the 3D bounding box of the object in a plurality of poses, based on a plurality of training images. The three-dimensional pose of the object is estimated using the plurality of 2D projections of the 3D bounding box.

30 Claims, 14 Drawing Sheets

(56) References Cited

U.S. PATENT DOCUMENTS

| | | | |
|---|---|---|---|
| 2011/0267344 A1* | 11/2011 | Germann | G06K 9/00201 345/420 |
| 2014/0092132 A1 | 4/2014 | Issa et al. | |
| 2014/0241617 A1 | 8/2014 | Shotton et al. | |
| 2014/0355825 A1* | 12/2014 | Kim | G06T 7/0046 382/103 |
| 2015/0206003 A1* | 7/2015 | Haker | G06K 9/00369 345/420 |
| 2016/0085310 A1 | 3/2016 | Shotton et al. | |
| 2017/0024634 A1* | 1/2017 | Miao | G06T 7/33 |
| 2017/0079722 A1* | 3/2017 | O'Grady | A61B 90/96 |
| 2017/0258418 A1* | 9/2017 | Averbuch | A61B 6/032 |
| 2017/0262695 A1* | 9/2017 | Ahmed | G06K 9/00288 |
| 2017/0316578 A1* | 11/2017 | Fua | G06T 7/73 |
| 2017/0337690 A1* | 11/2017 | Arth | G06T 7/136 |
| 2018/0071033 A1* | 3/2018 | Zhao | A61B 34/20 |
| 2018/0137644 A1* | 5/2018 | Rad | G06T 7/73 |

OTHER PUBLICATIONS

Dwibedi D., et al., "Deep Cuboid Detection: Beyond 2D Bounding Boxes", Cornell University Library, Olin Library Cornell University, Ithaca, NY, XP080735430, Nov. 30, 2016 (Nov. 30, 2016), pp. 1-11.

Gupta S., et al., "Aligning 3D Models to RGB-D Images of Cluttered Scenes", IEEE Conference on Computer Vision and Pattern Recognition (CVPR), XP032793931, Jun. 7, 2015 (Jun. 7, 2015), pp. 4731-4740.

International Search Report and Written Opinion—PCT/US2017/056276—ISA/EPO—dated Feb. 6, 2018.

Lu L., et al., "Deep Learning and Convolutional Neural Networks for Medical Image Computing", in "Deep Learning and Convolutional Neural Networks for Medical Image Computing", Springer, XP055444744, Jan. 1, 2017 (Jan. 1, 2017), p. 104.

Rad M., et al., "BB8: A Scalable, Accurate, Robust to Partial Occlusion Method for Predicting the 3D Poses of Challenging Objects without Using Depth", XP055444095, Mar. 31, 2017 (Mar. 31, 2017), pp. 1-9.

Brachmann E., et al., "Uncertainty-Driven 6D Pose Estimation of Objects and Scenes from a Single RGB Image", the IEEE Conference on Computer Vision and Pattern Recognition (CVPR), 2016, pp. 3364-3372.

Murthy J.K., et al., "Reconstructing Vechicles from a Single Image: Shape Priors for Road Scene Understanding", Computer Vision and Pattern Recognition, Sep. 29, 2016, 8 Pages.

Yasin H., et al., "A Dual-Source Approach for 3D Pose Estimation from a Single Image", Computer Vision and Pattern Recognition, Sep. 2015, pp. 4948-4956.

* cited by examiner

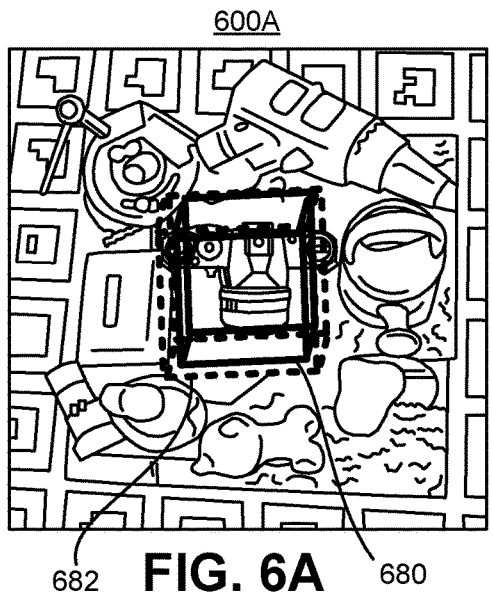
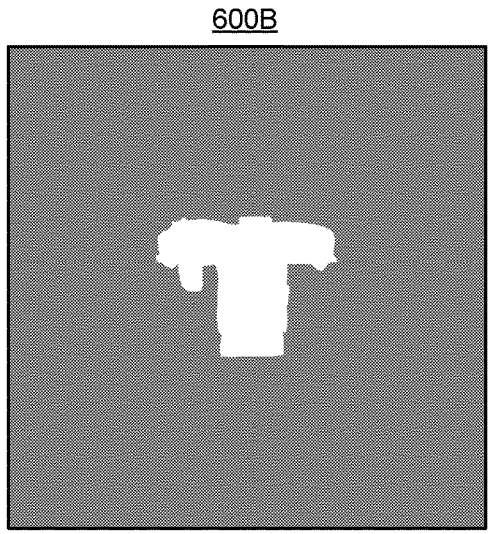
FIG. 6A   FIG. 6B
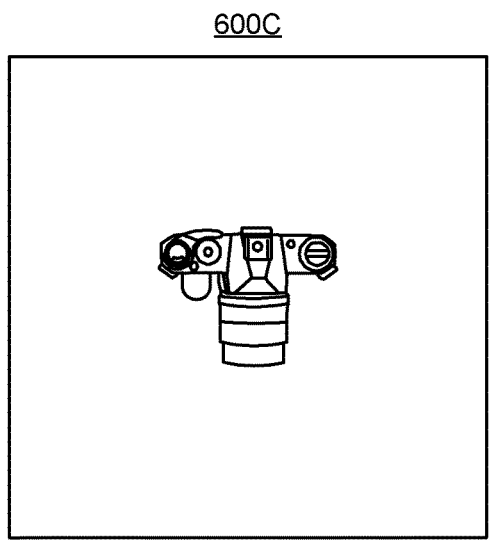
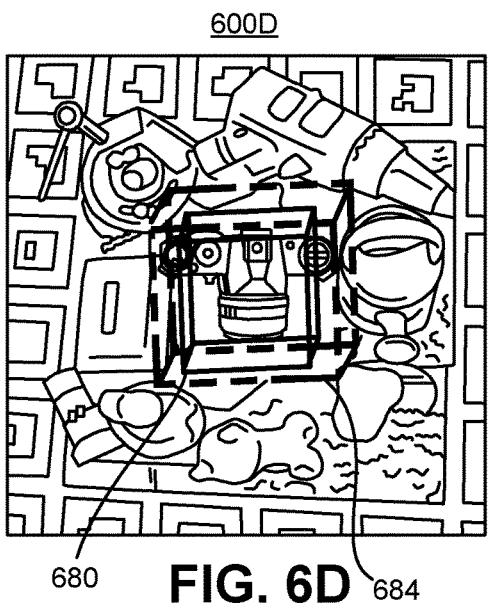
FIG. 6C   FIG. 6D

METHODS AND SYSTEMS OF PERFORMING OBJECT POSE ESTIMATION

CROSS-REFERENCE TO RELATED APPLICATIONS

This application claims the benefit of U.S. Provisional Application No. 62/420,944, filed Nov. 11, 2016, which is hereby incorporated by reference, in its entirety.

FIELD

The present disclosures generally relate to object pose estimation, and more specifically to systems and techniques for estimating the pose of an object from an input image.

BACKGROUND

Determining objects present in real images and attributes of those objects is useful for many applications. For instance, determining a pose of an object in an image can be used to facilitate effective operation of various systems. Examples of such applications include augmented reality (AR), robotics, automotive and aviation, in addition to many other applications.

In AR environments, for example, a user may view an integration of artificial or virtual graphics with the user's natural surroundings. AR applications allow real images to be processed to add virtual objects to a captured image and to align the virtual objects to the image in multiple dimensions. Artificial virtual objects that do not exist in reality or computer-generated copies of actual objects or structures of the user's natural surroundings can be added to the AR environment. For example, a graphic of a butterfly may fly along the view of AR goggles while the user continues to view his or her natural surroundings, regardless of whether the butterfly has any relevance to anything the user is seeing naturally. In another example, an actual object sitting on a table may be identified and rendered with a different color or different physical attributes in the AR environment.

Determining objects that are present in real images and determining the location and orientation of these objects facilitates effective operation of AR systems and may be used to aid virtual object placement.

BRIEF SUMMARY

In some embodiments, techniques and systems are described for performing object pose estimation. For example, the techniques and systems described herein can determine a three-dimensional pose of an object in an image using only the image as input. A bounding box of an object can be used in estimating the pose of the object. For example, a trained regressor can be used to predict two-dimensional projections of points of the object's bounding box in one or more images. In some cases, the two-dimensional projections include the projections of the corners of the bounding box. The techniques and system can then use the two-dimensional projections of the bounding box to compute the three-dimensional pose of the object in an input image.

The regressor can be trained using training images of an object. For each of the training images, corresponding poses of the object and three-dimensional points of the bounding box of the object are known. The known three-dimensional points of the bounding box can be projected onto an image plane to determine the two-dimensional projections of the bounding box that correspond to the known three-dimensional points of the bounding box. The trained regressor can map an image to the corresponding two-dimensional projections. The three-dimensional pose of the object in an input image can be computed from the 2D-3D correspondences. In some examples, the trained regressor can be a convolutional neural network.

In some examples, a portion of an input image can be used to predict the two-dimensional projections of the bounding box and to compute the predicted three-dimensional pose of the object for an input image. For example, a coarse-to-fine segmentation process may be used to locate a center of the object in the input image. The input image can be cropped to generate an image patch centered on the object. In such examples, the regressor can be trained and applied using image patches containing the object, instead of entire images.

In some implementations, the systems and techniques can also include training a second regressor (e.g., a convolutional neural network or the like) to update the two-dimensional projections of the bounding box of an object. For example, the systems and techniques can update the two-dimensional projections by comparing the input image and a rendering of the object for an initial pose estimate.

According to at least one example, a method of estimating a three-dimensional pose of an object is provided. The method includes obtaining an image including the object, and determining a plurality of two-dimensional projections of a three-dimensional bounding box of the object. The plurality of two-dimensional projections of the three-dimensional bounding box are determined by applying a trained regressor to the image. The trained regressor is trained to predict two-dimensional projections of the three-dimensional bounding box of the object in a plurality of poses. The method further includes estimating the three-dimensional pose of the object using the plurality of two-dimensional projections of the three-dimensional bounding box.

In another example, an apparatus is provided that includes a processor and a memory configured to store an image including the object. The processor is configured to and can obtain the image including the object. The processor is further configured to and can determine a plurality of two-dimensional projections of a three-dimensional bounding box of the object. The plurality of two-dimensional projections of the three-dimensional bounding box are determined by applying a trained regressor to the image. The trained regressor is trained to predict two-dimensional projections of the three-dimensional bounding box of the object in a plurality of poses. The processor is further configured to and can estimate the three-dimensional pose of the object using the plurality of two-dimensional projections of the three-dimensional bounding box.

In another example, a computer readable medium having stored thereon instructions that when executed by a processor perform a method, including: obtaining an image including an object; determining a plurality of two-dimensional projections of a three-dimensional bounding box of the object, the plurality of two-dimensional projections of the three-dimensional bounding box being determined by applying a trained regressor to the image, wherein the trained regressor is trained to predict two-dimensional projections of the three-dimensional bounding box of the object in a plurality of poses; and estimating a three-dimensional pose of the object using the plurality of two-dimensional projections of the three-dimensional bounding box.

In another example, an apparatus is provided for estimating a three-dimensional pose of an object. The apparatus includes: means for obtaining an image including the object; means for determining a plurality of two-dimensional projections of a three-dimensional bounding box of the object, the plurality of two-dimensional projections of the three-dimensional bounding box being determined by applying a trained regressor to the image, wherein the trained regressor is trained to predict two-dimensional projections of the three-dimensional bounding box of the object in a plurality of poses; and means for estimating the three-dimensional pose of the object using the plurality of two-dimensional projections of the three-dimensional bounding box.

In some examples, the regressor is a convolutional neural network.

In some examples, training the regressor includes: inputting a plurality of training images into the regressor, wherein each of the training images is taken from a different point of view and includes the object with a different pose from the plurality of poses; determining, for each of the plurality of training images, corresponding three-dimensional locations of the three-dimensional bounding box for a corresponding pose of the object in each of the plurality of training images; determining, for each of the plurality of training images, corresponding two-dimensional projections of the three-dimensional bounding box of the object, the corresponding two-dimensional projections being determined by projecting the corresponding three-dimensional locations of the three-dimensional bounding box onto an image plane of each of the plurality of training images; and determining mappings of each of the plurality of training images with the corresponding two-dimensional projections of the three-dimensional bounding box of the object.

In some examples, determining the plurality of two-dimensional projections of the three-dimensional bounding box by applying the trained regressor to the image includes: applying the mappings to the obtained image to determine corresponding two-dimensional projections of the three-dimensional bounding box of the object in the obtained image, wherein the obtained image is mapped to the corresponding two-dimensional projections using the mappings.

In some examples, the methods, apparatuses, and computer readable medium described above further comprise determining an image patch in the image. The image patch is centered on the object. In such examples, the plurality of two-dimensional projections of the three-dimensional bounding box are determined by applying the trained regressor to the image patch.

In some examples, determining the image patch includes: segmenting the image into an object area map of the image, the object area map including a grid of object area blocks; determining a respective probability for each of the object area blocks in the grid, wherein a probability of an object area block indicates a probability that the object is located in the object area block; and selecting an object area block with a highest determined probability from the grid of object area blocks.

In some examples, determining the image patch further includes: segmenting the selected object area block into a plurality of object center blocks; determining a respective probability for each of the object center blocks in the plurality of object center blocks, a probability of an object center block indicating a probability that a center of the object is located in the object center block; selecting an object center block with a highest determined probability from the plurality of object center blocks; determining a center of the object in the selected object center block; and generating the image patch by cropping the image, wherein the cropped image is centered on the center of the object.

In some examples, estimating the three-dimensional pose of the three-dimensional object using the plurality of two-dimensional projections of the three-dimensional bounding box includes: estimating a pose of a calibrated camera for the image, wherein the pose of the calibrated camera for the image is estimated using three-dimensional locations of the three-dimensional bounding box for the object in the image and the plurality of two-dimensional projections of the three-dimensional bounding box of the object in the image, wherein the plurality of two-dimensional projections include projections of the three-dimensional locations of the three-dimensional bounding box.

In some examples, the plurality of two-dimensional projections of the three-dimensional bounding box of the object include projections of corners of the three-dimensional bounding box.

In some examples, the image includes a red-green-blue (RGB) image. In some examples, the image does not include depth information.

In some examples, the determined three-dimensional pose includes a three-dimensional orientation of the object and a three-dimensional translation of the object.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 6A illustrates an example of an image for which pose refinement is applied, in accordance with some examples.

FIG. 6B illustrates an example of a binary mask generated for the image shown in FIG. 6A, in accordance with some examples.

FIG. 6C illustrates an example of a color rendering of the camera object in the image shown in FIG. 6A, in accordance with some examples.

FIG. 6D illustrates an example of an image for which pose refinement is applied using a predicted update, in accordance with some examples.

DETAILED DESCRIPTION

Figure 1:
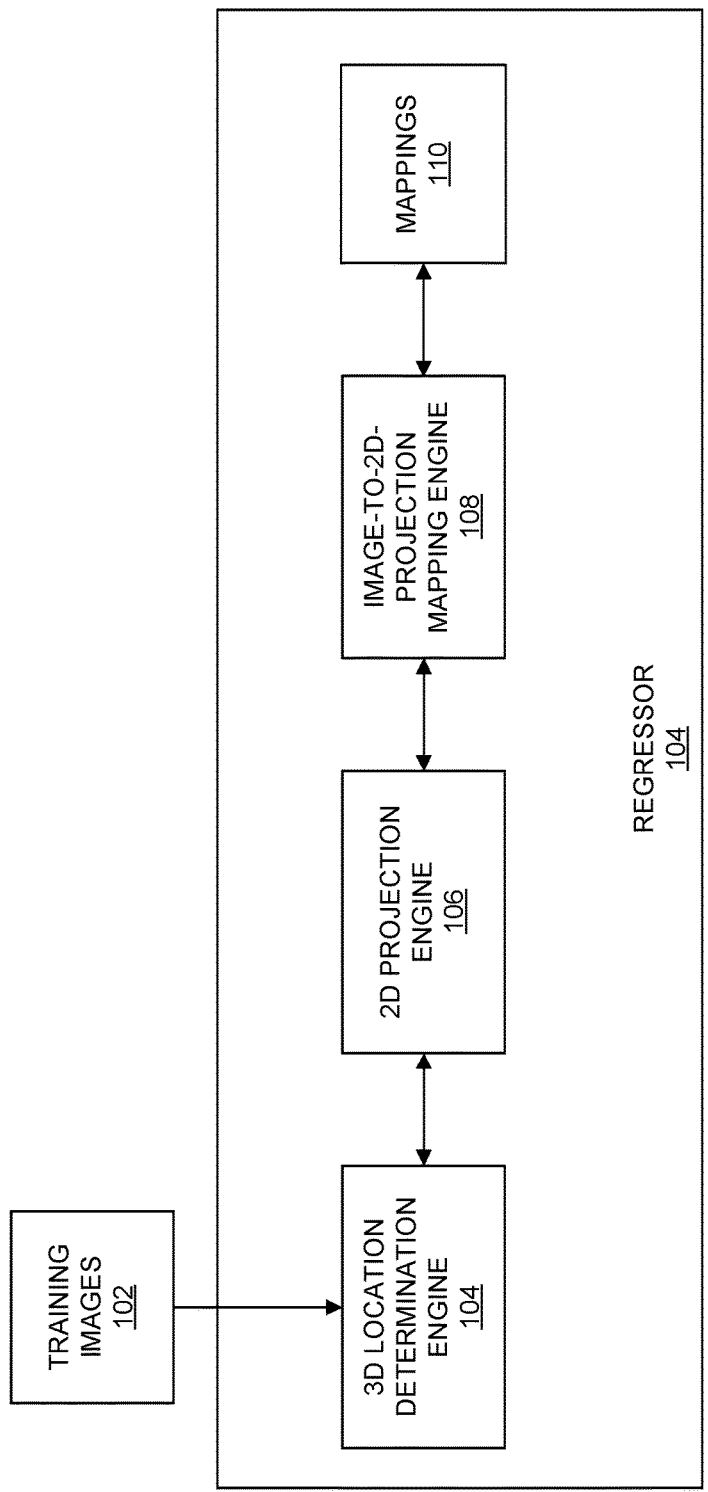
FIG. 1 is a block diagram illustrating an example of a regressor, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Three-dimensional (3D) pose estimation is the process of determining the orientation (or rotation) and translation of an object (e.g., in a two-dimensional (2D) image, in a laser scan, or other medium that portrays the 3D object). Pose estimation produces a 3D pose with six degrees of freedom, including three dimensions for orientation and three dimensions for translation. 3D pose estimation of object instances has become a popular problem, and has application in various fields. For example, 3D pose estimation can be used in robotics, virtual reality, augmented reality, as well as in many other fields.

Some approaches to 3D pose estimation rely on depth maps, in some cases in conjunction with more standard color images. The depth map information makes the 3D pose estimation problem easier to solve. However, in some cases, it is not always possible to use depth cameras. For example, a depth camera may fail in outdoor applications or on specular objects. Furthermore, a depth cameras are active sensors, and can drain the batteries of mobile devices.

It is desirable to be able to rely only on color images for 3D pose estimation. One possible approach using color images is to identify feature points lying on the object of interest. However, such feature point-based methods may be limited to very textured images. For example, keypoint-based methods may perform well, but only on very textured objects.

The apparition of inexpensive 3D cameras favors the development of methods suitable for untextured objects. Some methods may rely on depth data only and may use votes from pairs of 3D points and their normals to detect 3D objects. Other methods may use a decision tree applied to red-green-blue-depth (RGB-D) images to simultaneously recognize the objects and predict their poses.

Template-based methods can also be used, which can consider low-textured objects. For example, other methods can consider a template-based representation computed from RGB-D (or RGB) data, which allows for large scale detection. After getting a match between the input image and a template, an ICP optimization can be performed between the 3D model of the detected object and the depth map. However, such template-based methods are sensitive to partial occlusions.

To consider low-textured objects while being robust to partial occlusions, the "object coordinates" of an object's pixels can be identified, which include the 3D coordinates of the pixels in a coordinate system related to the object. The object 3D pose can then be estimated using 2D-3D correspondences. Some methods can rely on local patches recognition performed with Random Forests. For example, 3D object coordinates can be considered by training a Random Forest to predict the 3D location in the object coordinate system of each image location. The prediction of this forest is integrated in an energy function together with a term that compares the depth map with a rendering of the object and a term that penalizes pixels that lie on the object rendering but predicted by the forest to not be an object point. Identifying the object coordinates is difficult and the output is typically very noisy. A RANSAC optimization may be needed to sort out the inlier object coordinates and to estimate the pose robustly. For example, the energy function can be optimized by a RANSAC procedure. Some methods replace this energy function by an energy computed from the output of a convolutional neural network (CNN) trained to compare observed image features and features computed from a 3D rendering of the potentially detected object. This makes the approach robust to partial occlusions.

The above-described techniques, however, are designed for RGB-D data that includes depth information. Some methods extend these techniques to rely on RGB data only. For example, Auto-Context can be used to obtain better predictions from the random forests, estimate a distribution over the object coordinates to handle the prediction uncertainties better, and propose a more sophisticated RANSAC-like method that scales with the number of objects. This results in an efficient and accurate method, however robustness to partial occlusions is not demonstrated.

Part-pose based techniques demonstrates robustness to partial occlusions with RGB only images, however are based on part detection and therefore require the presence of distinctive parts on a target object. The part poses are predicted in the form of a set of 2D projections of virtual points.

Some methods rely on a CNN to directly predict a 3D pose, but in the form of a 3D vector and a quaternion. These methods are applied to camera relocalization rather than 3D object detection, and the full image can be used as input to the CNN. As described in more detail below, by predicting the 2D projections of the bounding box of an object (e.g., the corners of the bounding box, or other suitable points of the bounding box), the systems and methods described herein avoid the need for a scale factor to balance the position and orientation errors, and the pose is more accurate when predicted in this form.

Other methods also use a CNN to predict the 3D pose of generic objects, but from RGB-D data. For example, such methods may first segment the objects of interest to avoid the influence of clutter. However, segmenting the objects performs poorly on a LINEMOD dataset even with state-of-the-art segmentation methods, due to the objects being relatively small in the images and the resolution being relatively low. Segmentation is not needed in the systems and methods described herein, as a CNN trained with cluttered background is able to predict a reliable 3D pose.

Efficient and accurate systems and methods for pose estimation of objects from images are described herein. For example, a 3D pose of an object from a color image (e.g., a red-green-blue (RGB) image, or other suitable color image) can be determined using the systems and methods described herein. The color image can be used as the sole input, without requiring depth information. For example, the systems and methods described herein can operate using RGB data without using depth, in which case an RGB-depth (RGB-D) image is not necessary.

The systems and methods can train a regressor to predict the 3D pose of an object given an entire input image or given a patch or window of the image centered on the object, even under cluttered background and partial occlusion. The regressor can be trained to predict the 3D pose of an object "holistically", directly from a color image of the image. The 3D pose of the object of interest can be predicted even when the image containing the object contains other objects in the background or objects partially occluding the object of interest, despite the difficulty of such a problem. This avoids the need for predicting the object coordinates and the RANSAC optimization as intermediate steps. As described herein, the regressor can include a convolutional neural network (CNN). The regressor can then be applied to image locations determined by two-dimensional (2D) location detection.

In some examples, the predicted 3D pose can be represented directly by a translation and a rotation (or orientation). In some examples, even better accuracy may be achieved in some instances by predicting 2D projections of a bounding box of the object (e.g., 2D projections of the corners of the bounding box), and then computing the 3D pose from these 2D-3D correspondences. For example, a correspondence of the 2D-3D correspondences can include a correspondence between the 3D location of a point of the bounding box (e.g., a 3D corner of the bounding box) and the 2D projection in the image of that point on the bounding box, as predicted by the regressor. A difference from other approaches is that these predictions are typically outlier-free, and RANSAC is not needed. Moreover, using the 2D projections may also avoid the need for meta-parameters to balance the translation terms and the rotation terms.

In some examples, for improved accuracy, a second regressor (e.g., a convolutional neural network or other suitable machine learning technique) can be trained to update the 2D projections of the bounding box of an object, by comparing the input image and a rendering of the object for the initial pose estimate. For example, the network can be applied for a number of iterations to improve the pose accuracy. Training the regressor to update the 2D projections can result in a simple, efficient, and accurate method.

FIG. 1 shows an example of a regressor 104 configured to implement one or more aspects described herein. The regressor 104 is trained using training images 102. In some examples, the training images 102 can include entire images in which a target object of interest is located and undergoing one or more poses. In some examples, the training images 102 can include a training set made of image windows (denoted as W herein) containing the target object under one or more poses. Based on the training, the regressor 104 generates mappings 110 that can be stored and used for application to one or more input images to determine a 3D pose of one or more objects in the input images. The regressor 104 can include a convolutional neural network (CNN). As described in more detail below, the trained regressor 104 can be used to predict 2D projections of a bounding box of a target object in an image, which can then be used to compute the 3D pose of the object in an input image.

In some examples, for each of the training images 102, corresponding poses of a target object and 3D points of a bounding box of the object are known. For example, the 3D locations of the target object's bounding box points (e.g., corners of the bounding box) are already known during the training, as a 3D model of the object is known. The 3D points therefore do not need to be predicted during training. During the training phase, the 3D locations are used—they are projected to the image, using a ground truth pose, to get the 2D projections. The 3D location determination engine 104 can determine the 3D locations of the points of the bounding box in each of the training images 102. Any 3D points on an object's bounding box can be determined by the 3D location determination engine 104. In some examples described herein, the 3D locations of the corners of an object's bounding box may be determined and used to train the regressor 104. However, one of ordinary skill will appreciate that any point along an object's bounding box can be used. In one illustrative example, for a first training image with a target object in a known pose, the 3D locations of the corners of the target object's bounding box in the pose are determined by the 3D location determination engine 104.

Figure 2:
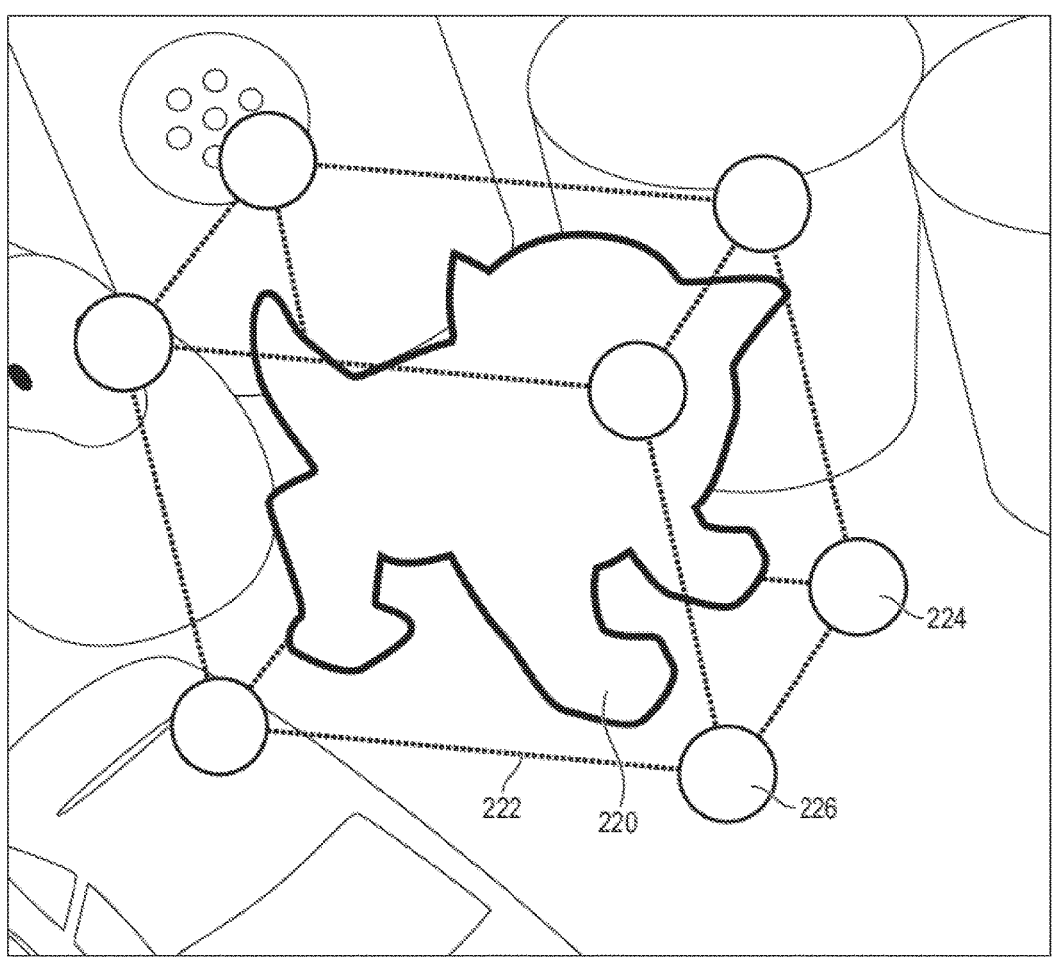
FIG. 2 is an illustration of an image in which a bounding box is shown with two-dimensional projections, in accordance with some examples.

A 2D projection engine 110 can then determine 2D projections that correspond to the determined 3D locations of the points on the target object's bounding box. For example, the 2D projection engine 110 can determine the 2D projections by projecting the determined 3D locations of the corners of the bounding box onto an image plane of each training image (e.g., the eight corners of a bounding box surrounding a target object). Any suitable image projection technique for projecting 3D points of an object to an image plane may be used by the 2D projection engine 110. FIG. 2 shows an example of an image of a cat object 220 and a bounding box 222 of the cat object 220. The 2D projections of the eight corners of the bounding box are shown with dots on each corner, including 2D projection 224 and 2D projection 226.

The image-to-2D-projection mapping engine 108 can generate mappings 110 based on the training. The mappings 106 can map an image with an object to the corresponding two-dimensional projections of the points on the bounding box of the object (e.g., the corners). During run-time when input images are processed for determining 3D poses of a target object in the images, the 3D poses can be computed by mapping an input image with an object to the corresponding two-dimensional projections of the points on the bounding box. For example, by training the regressor 104 to identify 2D projections of a bounding box for a target object exhibiting different poses in the various training images, the pose engine 332 described below can use the trained regressor 104 to identify the 2D projections of the target object's bounding box for an input image. The 2D projections can then be used to determine the 3D pose of the target object in the input image.

Figure 3:
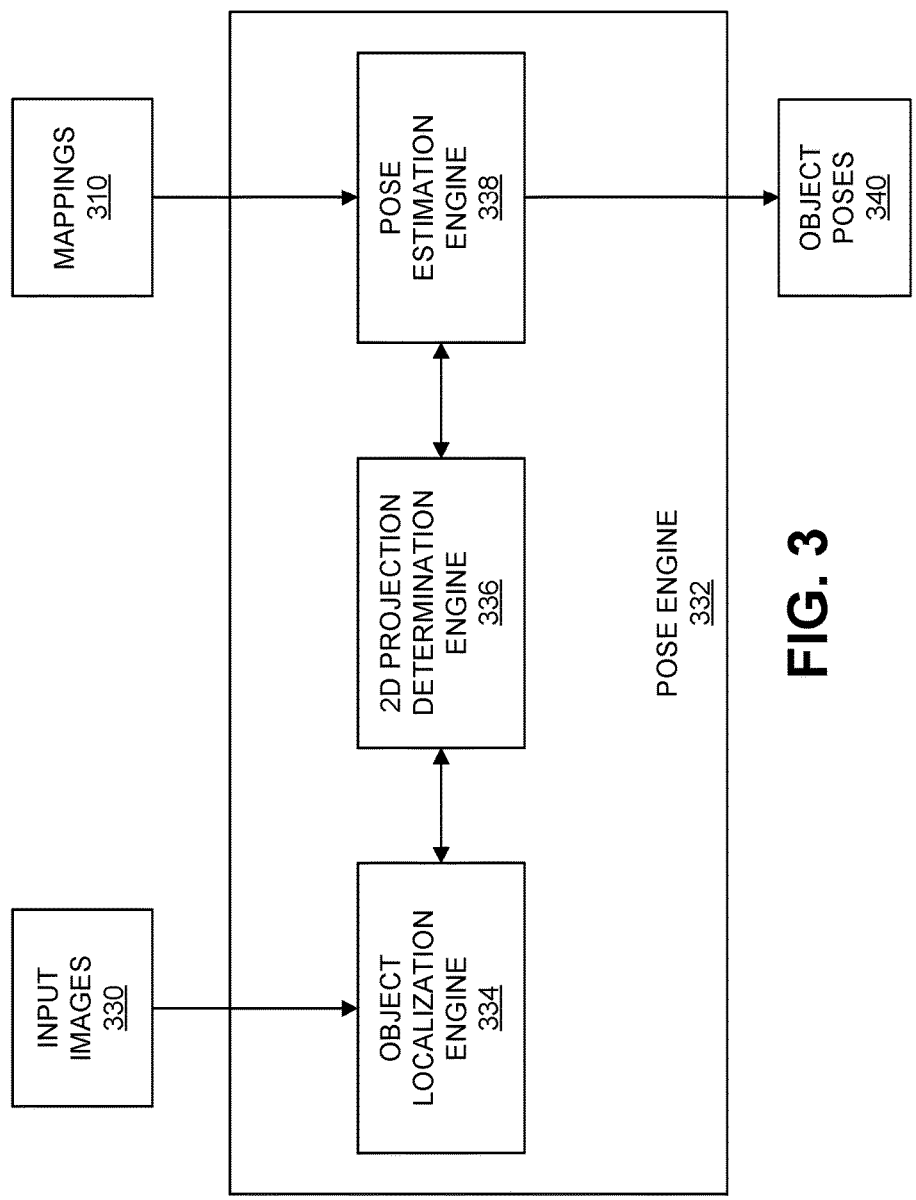
FIG. 3 is a block diagram illustrating an example of a system including a pose engine, in accordance with some examples.

FIG. 3 shows an example of the pose engine 332, which is configured to implement one or more aspects described herein. The pose engine 332 can estimate 3D object poses 340 of a target object in input images 330 that are obtained by the pose engine 332. The input images 330 can include color images, such as red-green-blue (RGB) images. For example, given a single color input image (e.g., an RGB image) including the target object, the pose engine 332 can estimate the 3D pose of the target object in the input image. The 3D pose can be estimated by the pose engine 332 based on the 2D projections of points on the object's 3D bounding box (e.g., the corners of the bounding box). It can be assumed that the 3D model of the target object is given.

Figure 4:
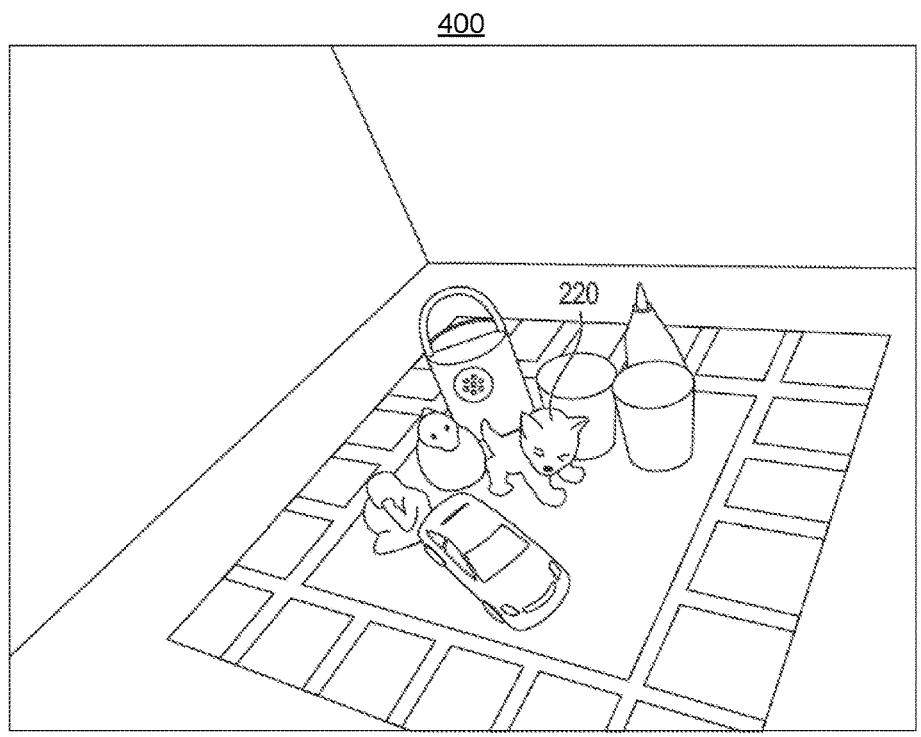
FIG. 4 is an illustration of an input image, in accordance with some examples.
Figure 5:
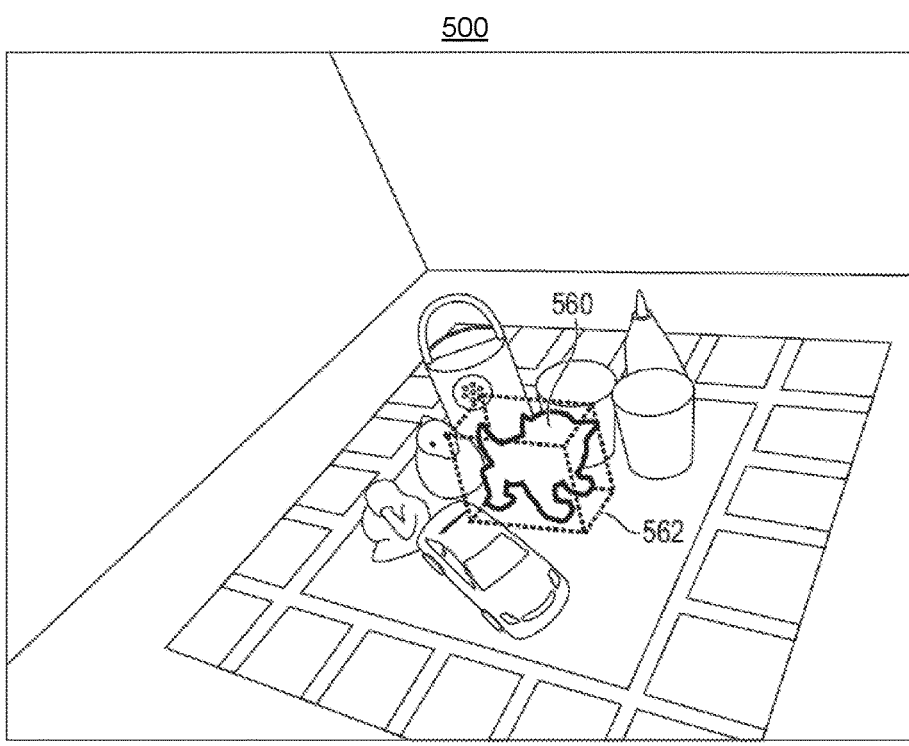
FIG. 5 is an illustration of an output image, in accordance with some examples.

The 2D projection determination engine 336 can use the trained regressor 104 and the mappings 310 described above to identify the 2D projections of the points on the target object's bounding box for an obtained input image. FIG. 4 illustrates an example of an input image 400 with the cat object 220. As noted previously, the points can include the corners of the bounding box, such as the corners of the bounding box 222 of the cat object 220 shown in FIG. 2. As described in further detail below, the pose estimation engine 338 can then use the 2D projections to determine the 3D pose of the target object in the input image. The pose estimation engine 338 can output the object poses 340 including the poses determined from the input images 330. FIG. 5 illustrates an example of an output image 500 with the object pose 560 of the cat object 220 and its bounding box 562.

Various implementations can be used to estimate the 2D projections of a target object's 3D bounding box given an image or an image window centered on the target object, and to estimate the object pose using the 2D projections. As previously described, the regressor 104 can include a convolutional neural network (CNN), such as a Deep Network or other suitable CNN. In some examples, the regressor 104 CNN can be trained to predict the 3D pose of a target object given an image window W centered on the object. Details regarding determination of the image window W (also referred to herein as a patch) are described further below with respect to the object localization engine 334. In other examples, the entire image can be used instead of the image window W.

In some examples, the regressor 104 CNN can be trained by minimizing the following cost function over the parameters $\Theta$ of the CNN:

$$\sum_{(W,e,t)\in\mathcal{T}} l(W, e, t; \Theta), \qquad (1)$$

where T is a training set made up of image windows W containing the object under a pose defined by an exponential map e and a 3D translation vector t. Each image window in the training set can have a different pose. The exponential map e is a way to parameterize a rotation, and is made of 3 values. At least two options can be used to predict or determine the 3D pose returned by the CNN, with one option including direct prediction of the pose and another option including predicting the pose through the 2D projections of the bounding box. The form of the loss function l in Equation (1) changes depending on which option is used.

When direct prediction of a pose of a target object is used, the function l can be expressed as the following in some examples:

$$l_d(W, e, t; \Theta) = \|R^T(e)R(e(f_\Theta(W))) - I\|_F^2 + \beta\|t - t(f_\Theta(W))\|^2. \qquad (2)$$

The function e(.) returns the components of the output of the CNN $f_\Theta$ corresponding to the exponential map e. The function t(.) is similar to e(.), but returns the components of the output of the CNN $f_\Theta$ corresponding to the translation vector t. R(e) is the rotation matrix corresponding to the exponential map vector e. The form of the first term in Equation (2) allows the system to optimize over the rotation components without having to handle the fact that multiple representations correspond to the same rotation—this may be true for any rotation parameterization. At run-time (using a trained regressor), given an image window W centered on a target object of interest, the system simply has to invoke the trained CNN $f_\Theta(.)$ to get an estimate of the pose (denoted as $(\hat{e},\hat{t})=f_\Theta(W)$) of the target object in the given image window W.

When predicting the pose of a target object through the 2D projections of the object's bounding box, the function 1 can be expressed as the following in some examples:

$$l_r(W, e, t; \Theta) = \sum_i \|Proj_{e,t}(M_i) - m_i(f_\Theta(W))\|^2, \quad (3)$$

where the $M_i$ are the 3D coordinates of the corners of the bounding box (or other points of the bounding box in some examples) in the object coordinate system. The term $Proj_{e,t}(M)$ projects the point M on the image plane from the pose defined by e (rotation) and t (translation). The function $m_i(.)$ returns the components of the output of the CNN $f_\Theta$ corresponding to the predicted 2D projection coordinates of the i-th corner. At run-time (e.g., using the trained regressor 104 and the pose engine 332), given an image window W centered on a target object of interest, the 3D pose of the target object can then be estimated for the correspondences between the 3D points $M_i$ and the predicted $m_i(f_\Theta(W))$ using a pose estimation technique that estimates a pose given a set of 3D points in a world coordinate frame and their corresponding 2D points in the image. The 2D points in this example are the 2D projections estimated from an input image using the regressor CNN. In some examples, other 3D points could be used other than corners of the target object's bounding box. The corners of the bounding box are a natural choice as they encompass the object and are well spread in space.

One example of such a pose estimation technique that estimates a pose given a set of 3D points and their corresponding 2D points in the image includes perspective-n-point (PnP) algorithm. The PnP algorithm estimates a pose of a calibrated camera (relative to a target object in a certain pose) using a given set of n 3D points of the object's bounding box in world coordinates and their corresponding 2D projections in the image. The calibrated intrinsic camera parameters can also be used. The camera pose includes six degrees-of-freedom, including the rotation (e.g., roll, pitch, and yaw) and the 3D translation of the camera with respect to the world. Any suitable PnP technique can be used, including P3P, efficient PnP (EPnP), or other suitable PnP technique. One example of a PnP algorithm that can be used is described in Lepetit, V.; Moreno-Noguer, M; Fua, P. (2009). "*EPnP: An Accurate O(n) Solution to the PnP Problem*". *International Journal of Computer Vision*. 81 (2): 155-166, which is hereby incorporated by reference in its entirety and for all purposes.

In some examples, a refiner method can be performed to improve the accuracy of the pose estimates described above (using one or more of Equations 1-3). In some examples, the refiner method includes training a regressor (e.g., a convolutional neural network) to update the 2D projections of the bounding box of an object. The regressor used to update the 2D projections may include a different regressor than the regressor 104. The 2D projections can be updated by comparing an input image to a rendering of the object for an initial pose estimate. Another CNN (separate from the regressor 104 CNN $f_\Theta$) can be trained that predicts an update to improve the pose. The CNN can be denoted as $g_\mu$. The input to $g_\mu$ is two-fold. The first input is the image window W (or patch), as for the CNN $f_\Theta$. The second part of the input depends on the current estimate of the pose. For example, either a binary mask or a color rendering of the target object as seen from the current estimate can be used as the second input to $g_\mu$. In particular, the parameters μ of $g_\mu$ can be optimized by minimizing:

$$\sum_{(W,e,t)\in\mathcal{T}} \sum_{(\hat{e},\hat{t})\in N(e,t)} l_{ref}(W, e, t, \hat{e}, \hat{t}; \mu), \quad (4)$$

where N(e, t) is a set of poses sampled around a particular pose (e, t). The loss function $l_{ref}(.)$ is defined as:

$$l_{ref}(W, e, t, \hat{e}, \hat{t}; \mu) = \quad (5)$$
$$\sum_i \|Proj_{e,t}(M_i) - Proj_{\hat{e},\hat{t}}(M_i) - m_i(g_\mu(W, \text{Render}(\hat{e}, \hat{t})))\|^2,$$

where Render(e, t) is a function that returns a binary mask, or a color rendering, of the target object seen from the pose (e, t). At run-time, given a current estimate of the object pose (represented by the projections of the corners $\hat{v}=[\ldots \hat{m}_i^T \ldots]^T$) and the corresponding parameterization $(\hat{e}, \hat{t})$, this estimate can be updated by invoking $g_\mu$:

$$\hat{v} \leftarrow \hat{v} + g_\mu(W, \text{Render}(\hat{e},\hat{t})) \quad (6)$$

FIG. 6A-FIG. 6D illustrate an example of an image 600A for which pose refinement is applied. Given a first pose estimate, shown by the bounding box 680 (shown with a solid outline) in FIG. 6A, either a mask of the object (the camera shown in image 600A) is generated or a color rendering of the object is generated. The mask 600B is shown in FIG. 6B as a binary mask, and the color rendering 600C of the object is shown in FIG. 6C. Given the input image 600A and the mask 600B, for example, an update can be predicted that improves the object pose, shown by the bounding box 684 (shown with a mixed dash and dotted outline) shown in FIG. 6D. The bounding box 682 (shown with a dashed outline) shown in FIG. 6A corresponds to the ground truth pose.

In some examples, the pose engine 332 can include an object localization engine 334. Some implementations of the pose engine 332 do not include the object localization engine 334. The object localization engine 334 can determine an image patch (referred to as a window W above) of an image in which a target object of interest is located. For example, the object localization engine 334 can identify the 2D center of the target object in an input image by determining an image patch centered on the object. In some examples, as noted above, 2D projections of the 3D bounding box of the object can be determined by applying the trained regressor to the image patch (or window W) centered on the object.

In some examples, a standard 2D object detector can be used. In some examples, the object localization engine 334 can localize the target object in 2D approximately using segmentation, which results in better performance and can provide accurate locations even under partial occlusions. In some cases, coarse-to-fine segmentation can be used to detect the 2D location of the target object. For example, a two-level coarse-to-fine object segmentation can be used by the object localization engine 334 to identify the center of the target object in an input image.

In general, object localization using segmentation includes splitting the input image into regions of a certain size in a first stage (e.g., 64×64, 128×128, 64×128, or any other suitable size). Each region is segmented as a binary mask of a size determined by the region splitting of the input image (e.g., for a 128×128 split, each region can be segmented as a binary mask of a size 8×8). Only the largest component from the segmentation is kept, and each active location is segmented more finely in a second stage. A final result of the segmentation includes providing an estimated 2D center of the target object.

Figure 7A:
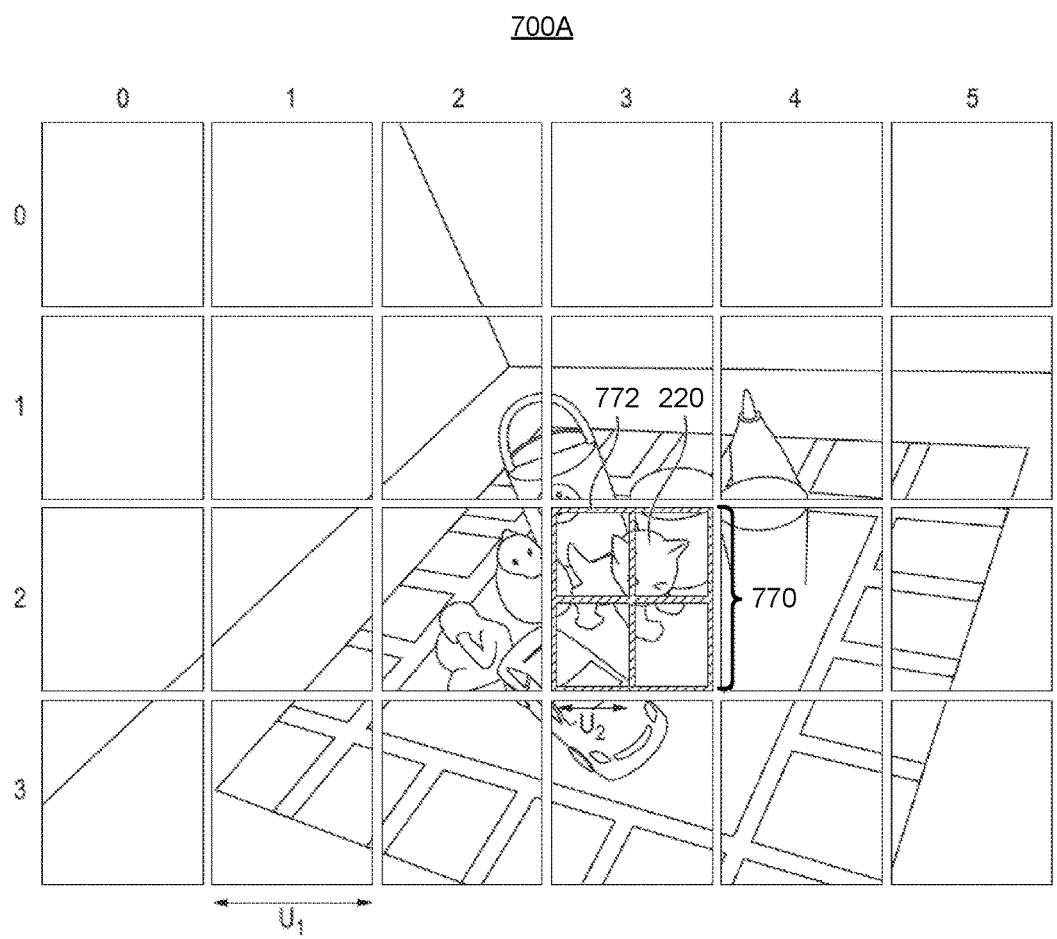
FIG. 7A is an illustration of an image for which an example of target object localization has been performed, in accordance with some examples.

In a first stage of the two-level coarse-to-fine object segmentation, the object localization engine 334 roughly locates the target object by a low resolution segmentation of the given input image, with an error of U1 pixels. In some examples, the first stage can be performed using a first localization regressor (e.g., a CNN or other suitable network). The first localization regressor used to perform the first stage may be different than the regressor 104 discussed above. FIG. 7A illustrates an image 700 for which the two-level coarse-to-fine object segmentation has been performed to locate the cat object 220. In the example of FIG. 7A, the segmentation of the first stage segments the image 700 into an object area map having a grid of N×M object area blocks. The example in FIG. 7A includes an object area map having dimensions of 4 rows×6 columns. The object localization engine 334 can determine a respective probability for each of the object area blocks in the grid indicating a probability that the object is located in each of the object area blocks. For example, the localization can be predicted by the first localization regressor, as noted above. The first localization regressor can be trained using binary values (based on whether the object is present or not in a given object area block). At run time, the first localization regressor predicts a probability that the object is present in a given object area block. In some cases, the probability is thresholded to a binary value. Further details are provided below with respect to Equations (7) and (8). The object area block from the N×M grid with a highest determined probability is selected for processing by a second stage of the two-level coarse-to-fine object segmentation. As shown in FIG. 7A, the object area block 770 located at row 2, column 3 of the object area map grid is identified as having the highest probability of containing the cat object 220.

Figure 7B:
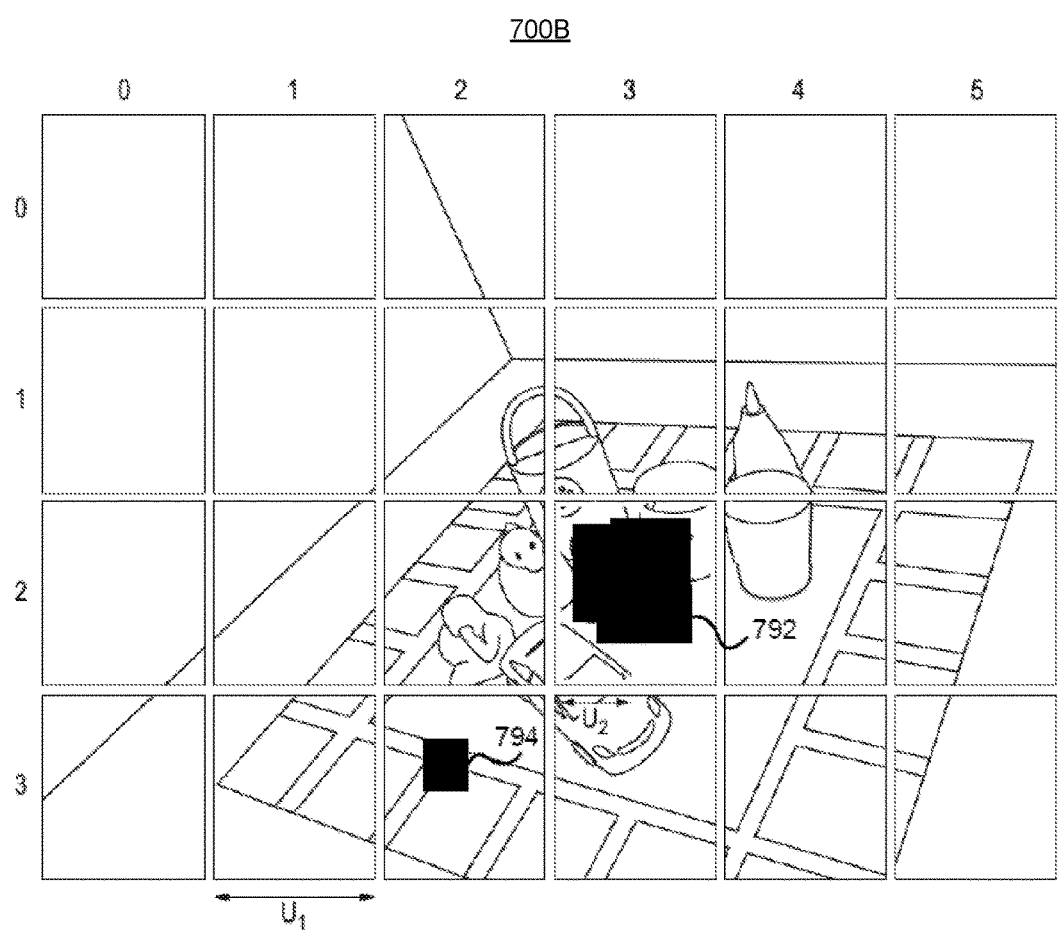
FIG. 7B is an illustration of an image with each region of the image being segmented as a binary mask, in accordance with some examples.

As noted above, the first stage of the segmentation can include training the first localization regressor to provide the low resolution segmentation of the target object given an image region J of a certain size (e.g., 64×64, 128×128, 64×128, or any other suitable size). In some examples, the first stage of the segmentation can be defined as:

$$s_1(J) = h_\phi^1(J) > \tau_1 \qquad (7)$$

where $s_1$ is a binary segmentation of a certain size for J (e.g., a binary mask of 8×8 for an image region J of size 128×128). The term $h_\phi^1$ is a segmentation network. The term $\tau$ is a threshold used to binarize the network's output. To obtain a binary segmentation $S_1$ for the input image, object localization engine 334 can split the input image into regions J and can compute $s_1$ for each region J. The first stage thus provides a binary segmentation $S_1$ for the full input image. FIG. 7B illustrates an example of an image 700b with each region of the image being segmented as a binary mask. Only the largest connected component in $S_1$ is kept. For example, referring to FIG. 7B, the largest connected component is the component 792, which is kept for processing in the second stage of the segmentation. The connected component 794 can be discarded. The object localization engine 334 can then proceed to refine its shape by applying the second stage of the segmentation. In some examples, the second stage can be performed using a second localization regressor (e.g., a CNN or the like). The second localization regressor can be the same regressor as the first localization regressor (e.g., the same CNN), or can be a different regressor (e.g., a different CNN).

Figure 7C:
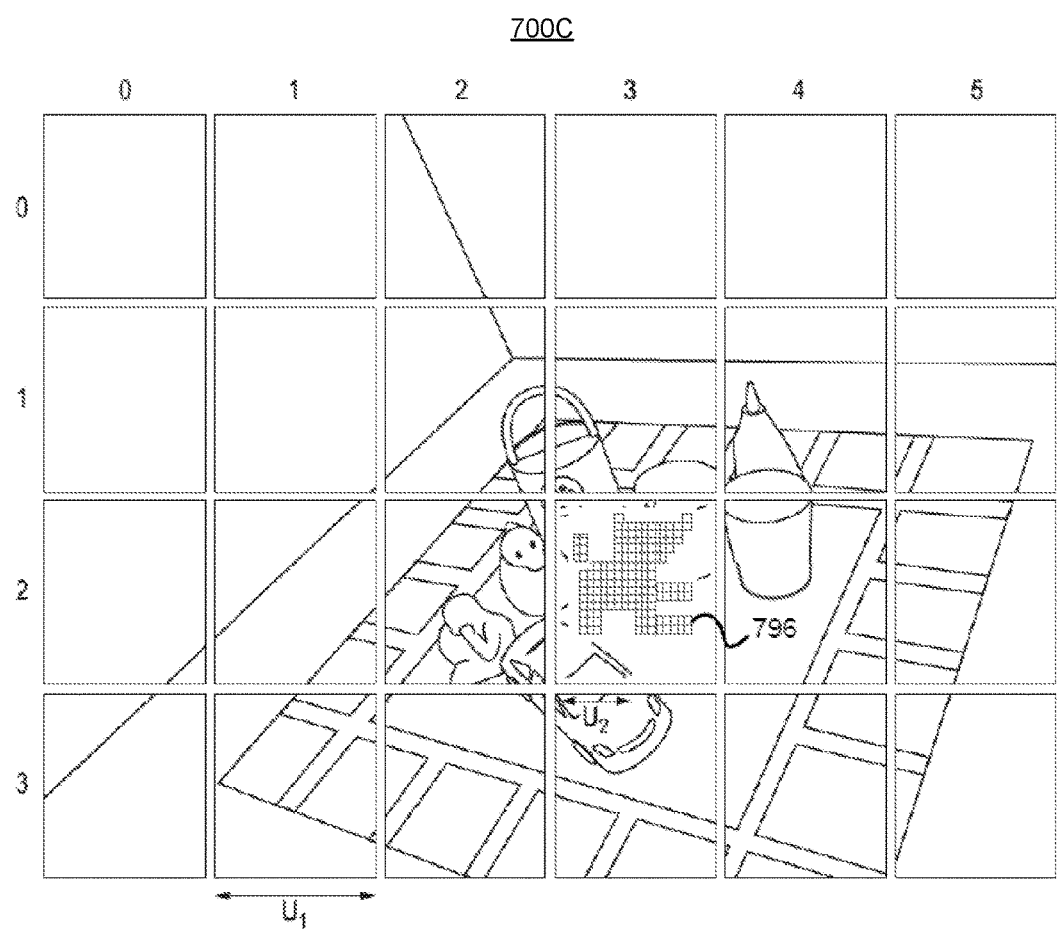
FIG. 7C is an illustration of an image showing application of a second segmentation to get an object segmentation, in accordance with some examples.

The second stage of the segmentation includes applying a second segmentation to get a more accurate object segmentation with an uncertainty of U2 pixels. The 2D center of the object is then the 2D center of the object segmentation. For example, referring to FIG. 7A, the object localization engine 334 can segment the selected object area block 770 into a plurality of object center blocks, including object center block 772. A respective probability for each of the object center blocks can then be determined indicating a probability that a center of the cat object 220 is located in each of the object center blocks. The object localization engine 334 can then select an object center block with a highest determined probability from the object center blocks in the selected object area block. In the example of FIG. 7A, the object center block 772 is selected as the object center block with the highest probability of containing the 2D center of the cat object 220. FIG. 7C illustrates an image 700C showing another example of application of the second segmentation to get an object segmentation 796. For example, using the second segmentation, each active location in the area of the connected component (FIG. 7B) is segmented more finely (e.g., the uncertainty is decreased from, for instance, 16 pixels to 4 pixels).

Figure 7D:
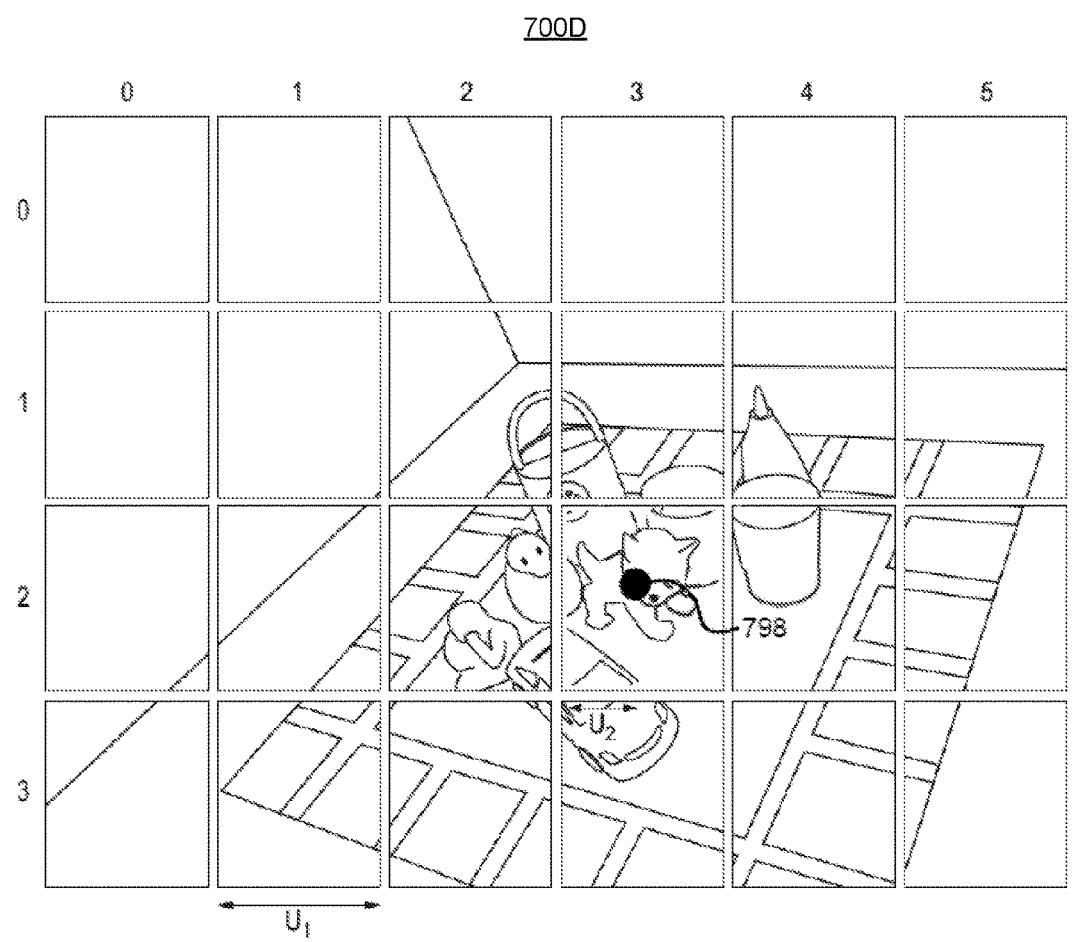
FIG. 7D is an illustration of an image of an object with an estimated object center, in accordance with some examples.

The center of the object in the selected object center block is then determined by the object segmentation. In one example, the centroid of the selected object center block can be used as the center of the object. FIG. 7D illustrates an image 700D with an estimated 2D object center 798. In one example, the centroid of the object segmentation 796 is used as the estimated 2D object center 798. The object localization engine 334 generates the image patch by cropping the image and centering the cropped image on the center of the object. The image 200 shown in FIG. 2 is an example of a cropped image centered on the center of the cat object 220.

As noted above, the result of the first stage can include the binary segmentation $S_1$ for the full input image, based on application of Equation (7) to each image region J. In such examples, only the largest connected component in $s_1$ is kept, and the object localization engine 334 can then proceed to refine its shape. This refinement is done by applying the second stage (e.g., a second CNN) to each image patch P of a certain size (e.g., a 16×16 image patch P) that corresponds to an active location in $S_1$:

$$S_2(P) = h_\psi^2(P) > \tau_2 \qquad (8)$$

The two stage segmentation thus efficiently computes a binary mask for the target object in the image. The centroid of the binary mask can then be used as the location of the 2D center of the target object.

Figure 8:
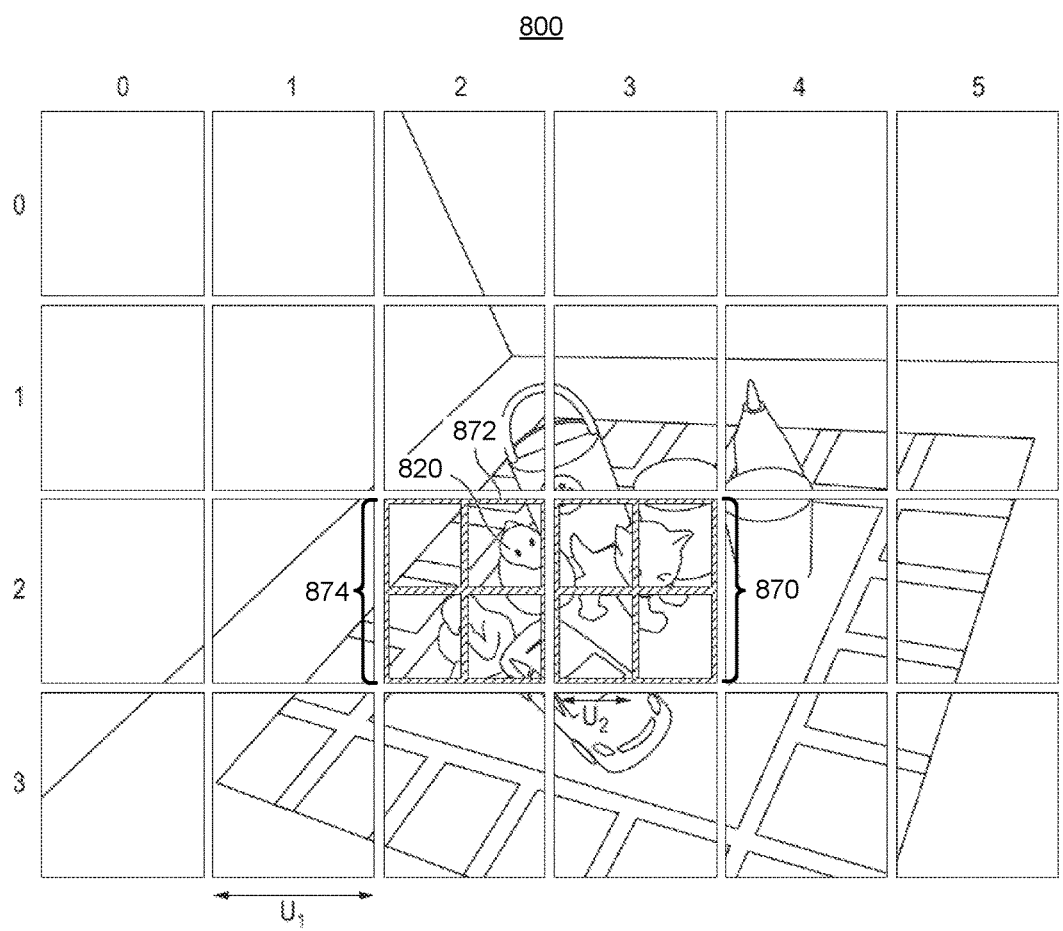
FIG. 8 is an illustration of an image for which another example of target object localization has been performed, in accordance with some examples.
Figure 9A:
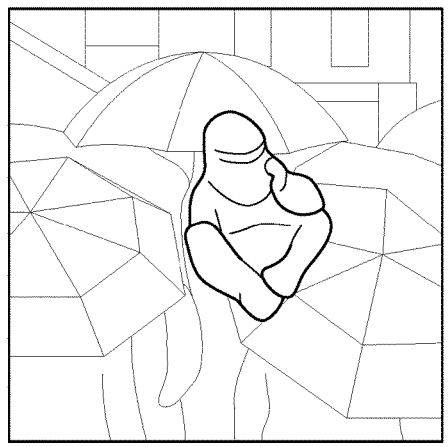
FIG. 9A-FIG. 9E illustrate examples of generated training images, in accordance with some examples.
Figure 9B:
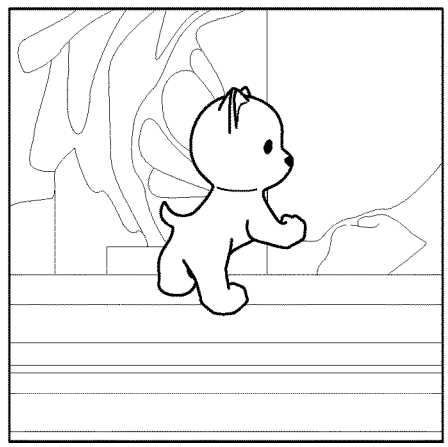
Figure 9C:
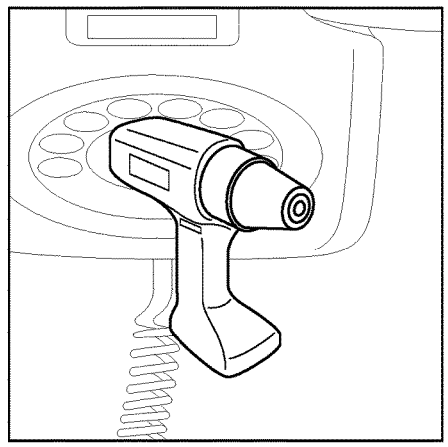
Figure 9D:
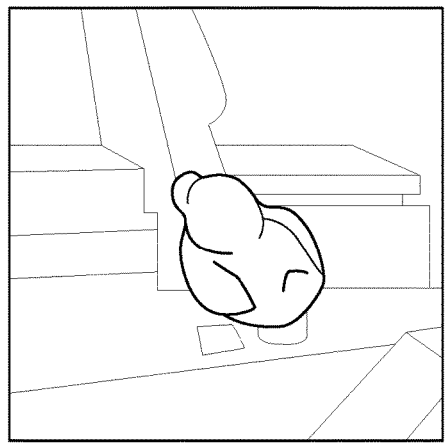
Figure 9E:
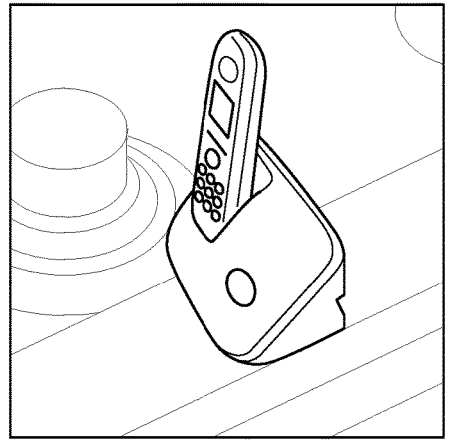

FIG. 8 illustrates another image 800 after the two-level coarse-to-fine object segmentation has been performed to locate a duck object 820. In the image 800, the duck object 820 is located on the border of two object area blocks 870 and 874. In such instances, the second stage of the coarse-to-fine object segmentation can generate two sets of object center blocks, one for each of the object area blocks 870 and 874. A probability can be determined for each of the object center blocks indicating a probability that a center of the duck object 820 is located in each of the object center blocks. The object localization engine 334 can select the object center block that is determined to have the highest determined probability from the object center blocks in two object area blocks 870 and 874. In the example of FIG. 8, the object center block 872 is selected as the object center block with the highest probability of containing the 2D center of the duck object 820. The center of the object 820 in the selected object center block is then determined by the object segmentation. The object localization engine 334 can then generate an image patch by cropping the image 800 and centering the cropped image on the center of the duck object 820.

A good object localizer can help to prevent losing performance of the predicted pose. As described above, to localize the target object in an image, a two-level coarse-to-fine object segmentation is used. Illustrative examples of the uncertainty terms include U1=16 pixels and U2=4 pixels. In some examples, a classical sliding window approach of size 128×128 for the first segmentation stage. In some cases, this can be efficiently implemented by sharing the convolutions between windows.

In some examples, other object localization methods can be used. One example includes a pixel-wise class labeling method, in which case the encoder weights from the VGG model can be trained on ImageNet. In another example, YOLO can be trained for the object detection task, in which case convolutional weights can be pre-trained on ImageNet.

FIG. 9A-FIG. 9E show examples of training images generated for use in training the regressor 104. In some examples, the training images can be segmented so that a patch or window of the full image containing the object of interest is used to train the regressor 104. The objects can be extracted from these images, which can be done easily as the ground truth poses and the objects' 3D models are available. Furthermore, to be robust to clutter and scale changes, the segmented objects can be scaled by a factor of s ∈ [$S_1$, $S_2$] and the background can be changed by a patch extracted from a randomly selected image from a dataset of available backgrounds (e.g., from an ImageNet dataset). Example values for $S_1$ and $S_2$ can include $S_1$=0.8 and $S_2$=1.2. However, one of ordinary skill will appreciate that any suitable values can be used. In some examples, the object of interest can be shifted by a number of pixels from the center of the image window in both x and y directions. This can help handle object localization error made by the detector.

An example set of generated training images used is 200,000 training images of size 128×128 for both the object location detection and the pose prediction, and 100,000 training images for the refinement. In some examples, the number of training images can be the same for location detection, pose prediction, and refinement. One of ordinary skill will appreciate that any suitable number of training images can be used.

Any suitable architectures for the pose prediction and refinement CNN networks can be used. In one illustrative example, for both the CNN $f_\Theta$ and the CNN $g_\mu$, a 6-layer architecture can be used, in which case the first layer uses 32 7×7 filters and performs a max-pooling of 4×4. The second layer uses 32 5×5 filters and 2×2 max-pooling. The last convolution layer uses 50 3×3 filters without any pooling. Two fully connected layers with 1024 hidden units can follow. The last fully connected layer can output 16 values in the examples in which the pose engine 332 predicts 2D projections of 8 vertices of the corners of an object's 3D bounding box, or their 2D updates. The rectified linear unit (ReLU) activation function can be used.

Any suitable architectures can also be used for the network of the object localization engine 334. In one illustrative example, for a first CNN detector used for the first stage of the coarse-to-fine object segmentation, a same architecture as the one described above for the regressor can be used, except for the last layer. The first stage has an uncertainty of $U_1$ pixels (e.g., 8 pixels for an input image of size 128×128 pixels), thus the last connected layer has 64 hidden units. A second CNN detector used for the second stage of the coarse-to-fine object segmentation can have an input of size 16×16, with an uncertainty of $U_2$ pixels (e.g., 4 pixels for the input image of size 128×128). In such an example, a 4 layers CNN would work for the second CNN detector. The first and second layers for both CNN detectors can have 32 and 16 convolutions filter of size 3×3 with no pooling respectively. A fully connected layer with 500 hidden units can be used as the third layer, and last layer can have 16 hidden units. In some examples, the object localization engine 334 can predict a 1 value if a target object has been presented in the interest area (e.g., in an object area block or object center block), or a −1 value if not. In such examples, a tan h activation function can be used for the last layer, which keeps the predicted values in this range.

In some examples, the various parameters of the networks can be optimized with a momentum of 0.9 and a decay of 0.001.

Figure 10:
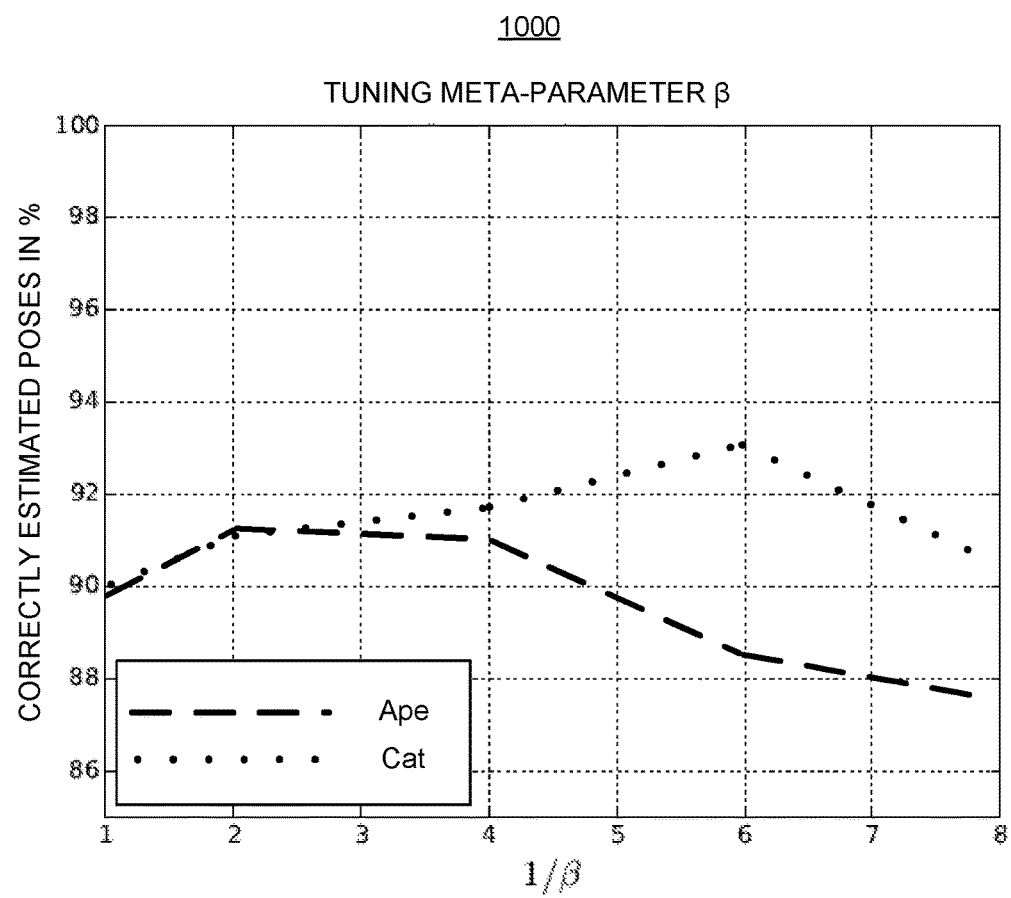
FIG. 10 includes a graph showing the performances of pose estimation when varying a meta parameter, in accordance with some examples.

As discussed above, an option to predict the 3D pose of an object in an input image is to directly predict the rotation and the translation. However, in some cases, the meta parameter β in Equation (2) needs to be tuned when the direct prediction is used. FIG. 10 includes a graph showing the performances of the pose estimation on the test set when varying the parameter β. For example, FIG. 10 shows a result of tuning the meta-parameter β in Equation (2) on two different objects of the LINEMOD dataset. Different objects need different values: the results for the Ape (shown with a dashed line) are better with _β=½ and better for the Cat (shown with a dotted line) with β=⅙. Thus, in order to get better performance, this parameter β may need to be tuned for each object separately, which may not be practical in some cases. Moreover, after tuning the parameter β, the final estimated poses may still be worse than poses estimated by predicting the 2D projection of the 3D bounding box of an object, as shown in Table 1 below. However, in some cases, the direct pose estimation may be beneficial.

TABLE 1

| | Results | | | |
|---|---|---|---|---|
| | Direct pose | BB8 | BB8 + Mask Refinement | BB8 + RGB Refinement |
| Ape | 91.2 | 96.2 | 97.3 | 97.6 |
| Bench Vise | 61.3 | 80.2 | 90.8 | 92.0 |
| Camera | 43.1 | 82.8 | 83.0 | — |
| Can | 62.5 | 85.8 | 92.2 | 93.7 |
| Cat | 93.1 | 97.2 | 98.7 | 98.7 |
| Driller | 46.5 | 77.6 | 82.5 | 83.4 |
| Duck | 67.9 | 84.6 | 94.0 | 94.1 |
| Eggbox | 68.2 | 90.1 | 92.2 | 93.4 |
| Glue | 69.3 | 93.5 | 94.3 | 96.0 |
| Holepuncher | 78.2 | 91.7 | 95.1 | 97.4 |
| Iron | 64.5 | 79.0 | 79.8 | 85.2 |
| Lamp | 50.4 | 79.9 | 83.9 | 83.8 |
| Phone | 46.9 | 80.0 | 85.3 | 88.8 |
| average | 64.9 | 85.4 | 89.9 | — |

The "Direct Pose" and "BB8" columns of Table 1 compare the direct pose prediction (6D Directly) and the pose estimated by predicting the 2D projection of the bounding box and using a PnP algorithm (BB8). For this evaluation, the ground truth 2D object center is used to avoid the influence of the detection. For certain objects the metaparameter β required by the direct pose prediction was optimized on the test set, which gives this approach an advantage. For the other objects, the value of β obtained for one of the objects. Even when the meta-parameter β is tuned, relying on the 2D projections yields an improvement. When β is not tuned specifically for the object, the improvement can reach greater percentages.

The columns "BB8," "BB8+Mask Refinement," and "BB8+RGB Refinement" of Table 1 compare the results of the BB8 method before and after two iterations of refinement, using either a binary mask (BB8+Mask Refinement) or a color rendering (BB8+RGB Refinement). For this evaluation, the ground truth 2D object center was used to avoid the influence of the detection. Using refinement improves the results by a certain percentage for the mask and color rendering respectively. Using a color rendering systematically yields the best results, but using the binary mask yields already a significant improvement, showing that an untextured model can be used.

Table 2 below compares the 2D projection-based method using the trained regressor 104 described above to another method applied to the Hinterstoisser dataset.

TABLE 2

Comparison

|  | 2D Proj. | Other Method |
| --- | --- | --- |
| Ape | 96.5 | 85.2 |
| Bench Vise | 91.0 | 67.9 |
| Camera | — | 58.7 |
| Can | 92.1 | 70.8 |
| Cat | 98.7 | 84.2 |
| Driller | 80.7 | 73.9 |
| Duck | 92.4 | 73.1 |
| Eggbox | — | 83.1 |
| Glue | 92.5 | 74.2 |
| Holepuncher | 95.1 | 78.9 |
| Iron | 85.0 | 83.6 |
| Lamp | 75.5 | 64.0 |
| Phone | 85.1 | 60.6 |
| average | — | 73.7 |

The same evaluation metric is used in both methods, which is the percentage of correctly predicted poses for each sequence. A pose is considered as correctly estimated if the average of the 2D distances between the projections of the object's vertices V from the estimated pose (ê, t̂) and the ground truth pose (ē, t̄):

$$\frac{1}{|\mathcal{V}|} \sum_{M \in \mathcal{V}} \left\| Proj_{(\hat{e},\hat{t})}(M) - Proj_{(\bar{e},\bar{t})}(M) \right\|_2 \quad (7)$$

is less than 5 pixels, or other suitable number of pixels. As shown in Table 2, the method described herein significantly outperforms the other, more complex method.

The above described systems and methods leverage the remarkable abilities for regression of Deep Networks to estimate very accurately the 3D poses of objects. Rather than directly predicting the pose, predicting the 2D projections of an object's bounding box can perform better. Furthermore, the process for localizing the object prior to the pose estimation step is based on segmentation to be robust to partial occlusions. In some examples, the iterative method described above for improving an initial estimate for the object pose can be included in some implementations to provide further improvements.

Figure 11:
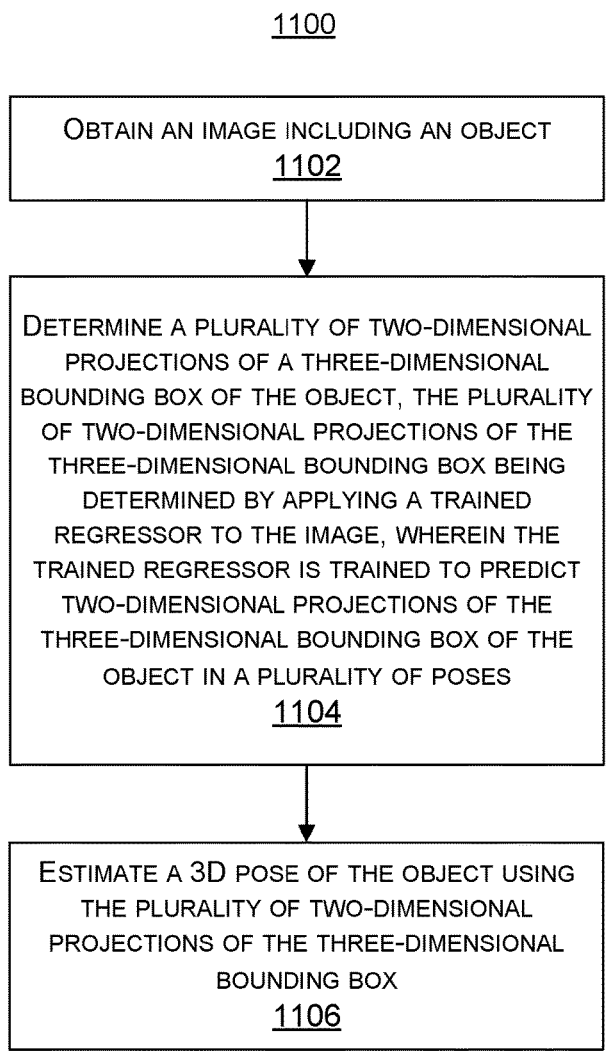
FIG. 11 is a flowchart illustrating an example of a process of estimating a pose of an object, in accordance with some examples.

FIG. 11 illustrates an example of a process 1100 of estimating a pose of an object using the techniques described herein. In some aspects, the process 1100 may be performed by a computing device or an apparatus, such as the regressor 104 shown in FIG. 1, the pose engine 332 shown in FIG. 3, or the computing device 1200 shown in FIG. 12, or any combination thereof. For example, the computing device or apparatus may include a mobile device, a person computer (PC), or any other suitable device configured to carry out the steps of process 1100. In some examples, the computing device or apparatus may include a camera configured to capture images. In some examples, a camera or other capture device that captures image data is separate from the computing device, in which case the computing device can receives the image data. The computing device may further include a network interface configured to communicate information to or from one or more other devices. The network interface may be configured to communicate Internet Protocol (IP) based data or any other type of data.

Process 1100 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1102, the process 1100 includes obtaining an image including the object. In some examples, the obtained image includes a red-green-blue (RGB) image. In some implementations, the image does not include depth information. In one illustrative example, the input image 400 can be obtained by the pose engine 332.

At 1104, the process 1100 includes determining a plurality of two-dimensional (2D) projections of a three-dimensional (3D) bounding box of the object in the image. The plurality of 2D projections of the 3D bounding box are determined by applying a trained regressor to the image. The trained regressor is trained to predict 2D projections of the 3D bounding box of the object in a plurality of poses. In some examples, the regressor includes a convolutional neural network (CNN). In some examples, the 2D projections of the 3D bounding box include 2D projections of corners of the 3D bounding box. An example of 2D projections of corners of an object's bounding box are shown in FIG. 2 (e.g., projections 224 and 226).

The regressor can be trained using the techniques described above. In some examples, training the regressor includes inputting a plurality of training images into the regressor. For instance, each of the training image can be taken from a different point of view and can include the object with a different pose from the plurality of poses. In one illustrative example, the regressor 104 can be trained using the training images 102, as described above. In such examples, training the regressor further includes determining, for each of the plurality of training images, corresponding 3D locations of the 3D bounding box for a corresponding pose of the object in each of the plurality of training images. Training the regressor further includes determining, for each of the plurality of training images, corresponding 2D projections of the 3D bounding box of the object. For example, the corresponding 2D projections can be determined by projecting the corresponding 3D locations of the 3D bounding box onto an image plane of each of the plurality of training images. In one illustrative example, a 3D location (e.g., in world coordinates) of a top-left, front corner of a bounding box of the object can be projected to the image plane to determine the 2D projection corresponding to that 3D location. Furthermore, training the regressor can further include determining mappings of each of the plurality of training images with the corresponding 2D projections of the 3D bounding box of the object. The regressor is thus trained to identify images in one or more obtained images that are similar to the training images, and to estimate 2D projections of the object in those images.

In some examples, determining the plurality of 2D projections of the 3D bounding box by applying the trained regressor to the image includes applying the mappings to the obtained image to determine corresponding 2D projections of the 3D bounding box of the object in the obtained image. The obtained image is mapped to the corresponding 2D projections using the mappings, as described above. For example, the mapping is done by the regressor from the obtained input image to the 2D projections.

At 1106, the process 1100 includes estimating the pose of the object using the plurality of two-dimensional projections of the three-dimensional bounding box. In some examples, estimating the pose of the 3D object using the plurality of 2D projections of the 3D bounding box includes estimating a pose of a calibrated camera for the image. The pose of the calibrated camera for the image is estimated using 3D locations of the 3D bounding box for the object in the image and the plurality of 2D projections of the 3D bounding box of the object in the image. The plurality of 2D projections include projections of the 3D locations of the 3D bounding box. One example of a pose estimation technique that can be used includes any of the perspective-n-point (PnP) algorithms described above. In some examples, the determined pose includes a 3D orientation (or rotation) of the object and a 3D translation of the object.

In some examples, the process 1100 includes determining an image patch in the image. The image patch can also be referred to herein as a window W. The image patch is centered on the object. In some examples, the plurality of 2D projections of the 3D bounding box are determined by applying the trained regressor to the image patch.

In some examples, determining the image patch includes segmenting the image into an object area map of the image. The object area map includes a grid of object area blocks. Example of images with grids of object area blocks are shown in FIG. 7A and FIG. 8. In such examples, determining the image patch further includes determining a respective probability for each of the object area blocks in the grid. A probability of an object area block indicates a probability that the object is located in the object area block. An object area block with a highest determined probability is selected from the grid of object area blocks.

In some examples, determining the image patch further includes segmenting the selected object area block into a plurality of object center blocks, and determining a respective probability for each of the object center blocks in the plurality of object center blocks. A probability of an object center block indicates a probability that a center of the object is located in the object center block. An object center block with a highest determined probability is selected from the plurality of object center blocks. Determining the image patch further includes determining a center of the object in the selected object center block, and generating the image patch by cropping the image. The segmentation described above can be used to determine the center of the object in the selected object center block. The cropped image is centered on the center of the object.

Figure 12:
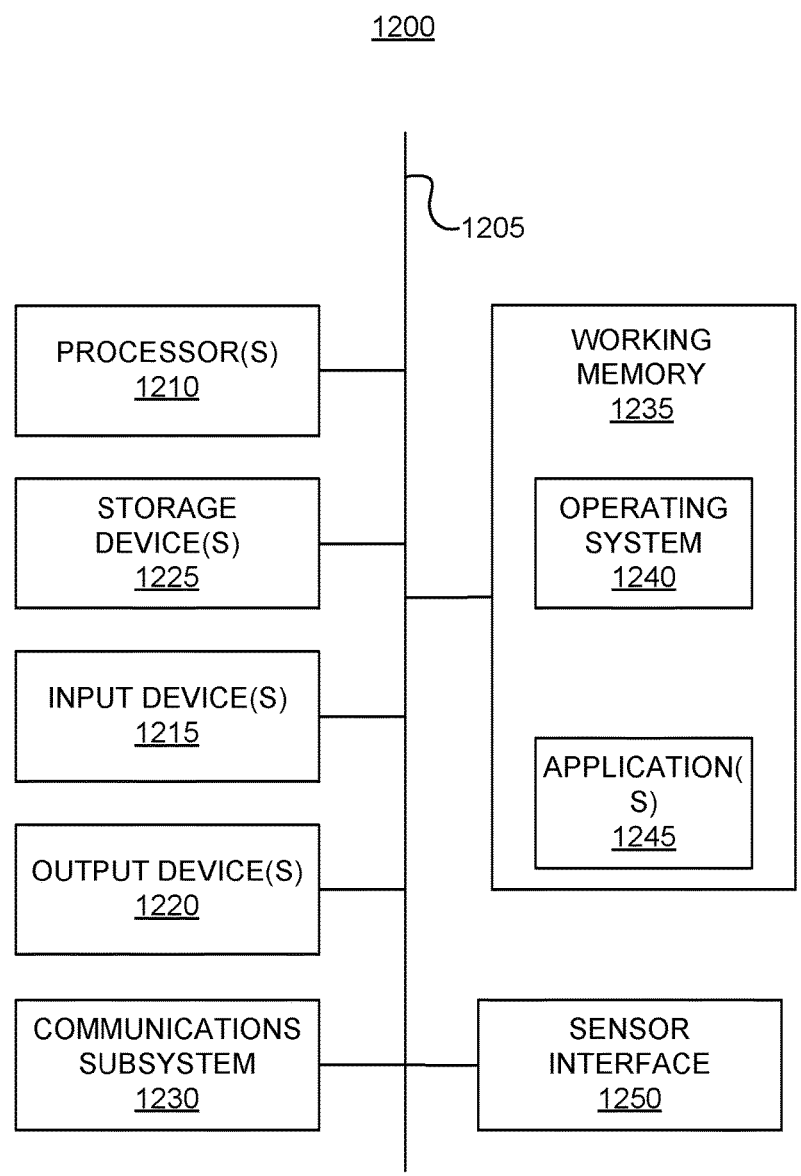
FIG. 12 illustrates an example of a computing system in which one or more embodiments may be implemented.

FIG. 12 illustrates an example computing device 1200 incorporating parts of the device employed in practicing embodiments of the invention. A computing device as illustrated in FIG. 12 may be incorporated as part of any computerized system, herein. For example, computing device 1200 may represent some of the components of a mobile device, or a computing device executing a 3D editing tool. Examples of a computing device 1200 include, but are not limited to, desktops, workstations, personal computers, supercomputers, video game consoles, tablets, smart phones, laptops, netbooks, or other portable devices. FIG. 12 provides a schematic illustration of one embodiment of a computing device 1200 that may perform the methods provided by various other embodiments, as described herein, and/or may function as the host computing device, a remote kiosk/terminal, a point-of-sale device, a mobile multifunction device, a set-top box and/or a computing device. FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computing device 1200 is shown comprising hardware elements that may be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which may include without limitation a camera, sensors 1250, a mouse, a keyboard and/or the like; and one or more output devices 1220, which may include without limitation a display unit, a printer and/or the like.

The computing device 1200 may further include (and/or be in communication with) one or more non-transitory storage devices 1225, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1200 might also include a communications subsystem 1230. The communications subsystem 1230 may include a transceiver for receiving and transmitting data or a wired and/or wireless medium. The communications subsystem 1230 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), other computing devices, and/or any other devices described herein. In many embodiments, the computing device 1200 will further comprise a non-transitory working memory 1235, which may include a RAM or ROM device, as described above.

The computing device 1200 may comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1225 described above. In some cases, the storage medium might be incorporated within a computing device, such as computing device 1200. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1200 and/or might take the form of source and/or installable code, which, upon compilation and/or installation on the computing device 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1200 such as network input/output devices may be employed.

Some embodiments may employ a computing device (such as the computing device 1200) to perform methods in accordance with the disclosure. For example, some or all of the procedures of the described methods may be performed by the computing device 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 1200, various computer-readable media might be involved in providing instructions/code to processor(s) 1210 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1225. Volatile media include, without limitation, dynamic memory, such as the working memory 1235. Transmission media include, without limitation, coaxial cables, copper wire and fiber optics, including the wires that comprise the bus 1205, as well as the various components of the communications subsystem 1230 (and/or the media by which the communications subsystem 1230 provides communication with other devices). Hence, transmission media may also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1200. These signals, which might be in the form of electromagnetic signals, acoustic signals, optical signals and/or the like, are all examples of carrier waves on which instructions may be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional blocks not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of blocks may be undertaken before, during, or after the above elements are considered. Accordingly, the above description does not limit the scope of the disclosure.

What is claimed is:

1. A method of estimating a three-dimensional pose of an object, the method comprising:
    obtaining an image including the object;
    determining a plurality of two-dimensional projections of points of a virtual three-dimensional bounding box of the object, the plurality of two-dimensional projections of the points of the virtual three-dimensional bounding box being determined by applying a trained regressor to the image, wherein the trained regressor is trained to predict two-dimensional projections of the virtual three-dimensional bounding box of the object in a plurality of poses; and
    estimating the three-dimensional pose of the object using the plurality of two-dimensional projections of the points of the virtual three-dimensional bounding box.

2. The method of claim 1, wherein the regressor is a convolutional neural network.

3. The method of claim 1, further comprising determining an image patch in the image, wherein the image patch is centered on the object, and wherein the plurality of two-dimensional projections of the points of the virtual three-dimensional bounding box are determined by applying the trained regressor to the image patch.

4. The method of claim 3, wherein determining the image patch includes:
    segmenting the image into an object area map of the image, the object area map including a grid of object area blocks;
    determining a respective probability for each of the object area blocks in the grid, wherein a probability of an object area block indicates a probability that the object is located in the object area block; and
    selecting an object area block with a highest determined probability from the grid of object area blocks.

5. The method of claim 4, wherein determining the image patch further includes:
    segmenting the selected object area block into a plurality of object center blocks;
    determining a respective probability for each of the object center blocks in the plurality of object center blocks, a probability of an object center block indicating a probability that a center of the object is located in the object center block;
    selecting an object center block with a highest determined probability from the plurality of object center blocks;
    determining a center of the object in the selected object center block; and
    generating the image patch by cropping the image, wherein the cropped image is centered on the center of the object.

6. The method of claim 1, wherein estimating the three-dimensional pose of the object using the plurality of two-dimensional projections of the points of the virtual three-dimensional bounding box includes:
    estimating a pose of a calibrated camera for the image, wherein the pose of the calibrated camera for the image is estimated using three-dimensional locations of the points of the virtual three-dimensional bounding box for the object in the image and the plurality of two-dimensional projections of the points of the virtual three-dimensional bounding box of the object in the image, wherein the plurality of two-dimensional projections include projections of the three-dimensional locations of the points of the virtual three-dimensional bounding box.

7. The method of claim 1, wherein the plurality of two-dimensional projections of the points of the virtual three-dimensional bounding box of the object include projections of corners of the virtual three-dimensional bounding box.

8. The method of claim 1, wherein the image includes a red-green-blue (RGB) image.

9. The method of claim 1, wherein the image does not include depth information.

10. The method of claim 1, wherein the estimated three-dimensional pose includes a three-dimensional orientation of the object and a three-dimensional translation of the object.

11. An apparatus for estimating a three-dimensional pose of an object, comprising:
a memory configured to store an image including the object; and
a processor configured to:
obtain the image including the object;
determine a plurality of two-dimensional projections of points of a virtual three-dimensional bounding box of the object, the plurality of two-dimensional projections of the points of the virtual three-dimensional bounding box being determined by applying a trained regressor to the image, wherein the trained regressor is trained to predict two-dimensional projections of the virtual three-dimensional bounding box of the object in a plurality of poses; and
estimate the three-dimensional pose of the object using the plurality of two-dimensional projections of the points of the virtual three-dimensional bounding box.

12. The apparatus of claim 11, wherein the regressor includes a convolutional neural network.

13. The apparatus of claim 11, wherein the processor is further configured to determine an image patch in the image, wherein the image patch is centered on the object, and wherein the plurality of two-dimensional projections of the points of the virtual three-dimensional bounding box are determined by applying the trained regressor to the image patch.

14. The apparatus of claim 13, wherein determining the image patch includes:
segmenting the image into an object area map of the image, the object area map including a grid of object area blocks;
determining a respective probability for each of the object area blocks in the grid, wherein a probability of an object area block indicates a probability that the object is located in the object area block; and
selecting an object area block with a highest determined probability from the grid of object area blocks.

15. The apparatus of claim 14, wherein determining the image patch further includes:
segmenting the selected object area block into a plurality of object center blocks;
determining a respective probability for each of the object center blocks in the plurality of object center blocks, a probability of an object center block indicating a probability that a center of the object is located in the object center block;
selecting an object center block with a highest determined probability from the plurality of object center blocks;
determining a center of the object in the selected object center block; and
generating the image patch by cropping the image, wherein the cropped image is centered on the center of the object.

16. The apparatus of claim 11, wherein estimating the three-dimensional pose of the object using the plurality of two-dimensional projections of the points of the virtual three-dimensional bounding box includes:
estimating a pose of a calibrated camera for the image, wherein the pose of the calibrated camera for the image is estimated using three-dimensional locations of the points of the virtual three-dimensional bounding box for the object in the image and the plurality of two-dimensional projections of the points of the virtual three-dimensional bounding box of the object in the image, wherein the plurality of two-dimensional projections include projections of the three-dimensional locations of the points of the virtual three-dimensional bounding box.

17. The apparatus of claim 11, wherein the plurality of two-dimensional projections of the points of the virtual three-dimensional bounding box of the object include projections of corners of the virtual three-dimensional bounding box.

18. The apparatus of claim 11, wherein the image includes a red-green-blue (RGB) image.

19. The apparatus of claim 11, wherein the image does not include depth information.

20. The apparatus of claim 11, wherein the determined estimated three-dimensional pose includes a three-dimensional orientation of the object and a three-dimensional translation of the object.

21. The apparatus of claim 11, wherein the apparatus comprises a mobile device.

22. The apparatus of claim 21, further comprising one or more of:
a camera for capturing one or more images; and
a display for displaying one or more output images.

23. A non-transitory computer readable medium having stored thereon instructions that, when executed by one or more processors, cause the one or more processor to:
obtain an image including an object;
determine a plurality of two-dimensional projections of points of a virtual three-dimensional bounding box of the object, the plurality of two-dimensional projections of the points of the virtual three-dimensional bounding box being determined by applying a trained regressor to the image, wherein the trained regressor is trained to predict two-dimensional projections of the virtual three-dimensional bounding box of the object in a plurality of poses; and
estimate a three-dimensional pose of the object using the plurality of two-dimensional projections of the points of the virtual three-dimensional bounding box.

24. The non-transitory computer readable medium of claim 23, wherein the regressor includes a convolutional neural network.

25. The non-transitory computer readable medium of claim 23, further comprising instructions that, when executed by the one or more processors, cause the one or more processors to determine an image patch in the image, wherein the image patch is centered on the object, and wherein the plurality of two-dimensional projections of the points of the virtual three-dimensional bounding box are determined by applying the trained regressor to the image patch.

26. The non-transitory computer readable medium of claim 25, wherein determining the image patch includes:
segmenting the image into an object area map of the image, the object area map including a grid of object area blocks;
determining a respective probability for each of the object area blocks in the grid, wherein a probability of an object area block indicates a probability that the object is located in the object area block; and
selecting an object area block with a highest determined probability from the grid of object area blocks.

27. The non-transitory computer readable medium of claim 26, wherein determining the image patch further includes:
  segmenting the selected object area block into a plurality of object center blocks;
  determining a respective probability for each of the object center blocks in the plurality of object center blocks, a probability of an object center block indicating a probability that a center of the object is located in the object center block;
  selecting an object center block with a highest determined probability from the plurality of object center blocks;
  determining a center of the object in the selected object center block; and
  generating the image patch by cropping the image, wherein the cropped image is centered on the center of the object.

28. The non-transitory computer readable medium of claim 23, wherein estimating the three-dimensional pose of the object using the plurality of two-dimensional projections of the points of the virtual three-dimensional bounding box includes:
  estimating a pose of a calibrated camera for the image, wherein the pose of the calibrated camera for the image is estimated using three-dimensional locations of the points of the virtual three-dimensional bounding box for the object in the image and the plurality of two-dimensional projections of the points of the virtual three-dimensional bounding box of the object in the image, wherein the plurality of two-dimensional projections include projections of the three-dimensional locations of the points of the virtual three-dimensional bounding box.

29. The non-transitory computer readable medium of claim 23, wherein the plurality of two-dimensional projections of the points of the virtual three-dimensional bounding box of the object include projections of corners of the virtual three-dimensional bounding box.

30. The non-transitory computer readable medium of claim 23, wherein the estimated three-dimensional pose includes a three-dimensional orientation of the object and a three-dimensional translation of the object.

* * * * *